United States Patent
Rofougaran

(10) Patent No.: US 8,064,495 B2
(45) Date of Patent: Nov. 22, 2011

(54) FREQUENCY HOPPING RF RECEPTION SYSTEM WITH PROGRAMMABLE ANTENNA AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/901,874

(22) Filed: Oct. 11, 2010

(65) Prior Publication Data

US 2011/0026565 A1   Feb. 3, 2011

Related U.S. Application Data

(62) Division of application No. 11/525,402, filed on Sep. 22, 2006, now Pat. No. 7,848,386.

(51) Int. Cl.
*H04B 1/00* (2006.01)

(52) U.S. Cl. ........ 375/136; 375/340; 343/822; 343/861; 455/150.1; 455/154.1

(58) Field of Classification Search .................. 375/132, 375/133, 136, 316, 340, 343; 343/725, 745, 343/750, 757, 822, 860, 861; 455/130, 131, 455/150.1, 151.2, 151.4, 154.1, 174.1, 175.1, 455/182.1, 192.1
See application file for complete search history.

(56) References Cited

U.S. PATENT DOCUMENTS

| 4,388,723 | A  | * | 6/1983  | Keen ............................. 375/136 |
| 4,545,059 | A  | * | 10/1985 | Spinks et al. .................. 375/133 |
| 6,928,265 | B2 | * | 8/2005  | Johannessen .................. 455/42 |
| 7,039,090 | B2 | * | 5/2006  | Boetzel et al. ................. 375/134 |
| 7,848,386 | B2 | * | 12/2010 | Rofougaran .................. 375/135 |

* cited by examiner

*Primary Examiner* — Dac Ha
(74) *Attorney, Agent, or Firm* — Garlick, Harrison & Markison; Bruce E. Stuckman

(57) ABSTRACT

A (radio frequency) RF reception system includes an RF receiver that demodulates an RF signal at a sequence of selected carrier frequencies. A frequency hop module, coupled to the RF receiver generates the sequence of selected carrier frequencies. A programmable antenna is tuned to each of the sequence of selected carrier frequencies to receive the RF signal via an antenna current.

16 Claims, 21 Drawing Sheets

FREQUENCY HOPPING RF RECEPTION SYSTEM WITH PROGRAMMABLE ANTENNA AND METHODS FOR USE THEREWITH

CROSS REFERENCE TO RELATED APPLICATIONS

The present U.S. patent application claims priority pursuant to 35 U.S.C. §121, as a divisional, to U.S. application Ser. No. 11/525,402, entitled "FREQUENCY HOPPING RF TRANSCEIVER WITH PROGRAMMABLE ANTENNA AND METHODS FOR USE THEREWITH," filed Sep. 22, 2006, pending which is hereby incorporated herein by reference in its entirety and made part of the present U.S. patent application for all purposes.

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Many wireless communication systems include receivers and transmitters that can operate over a range of possible carrier frequencies. Antennas are typically chosen to likewise operate over the range of possible frequencies, obtaining greater bandwidth at the expense of lower gain. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
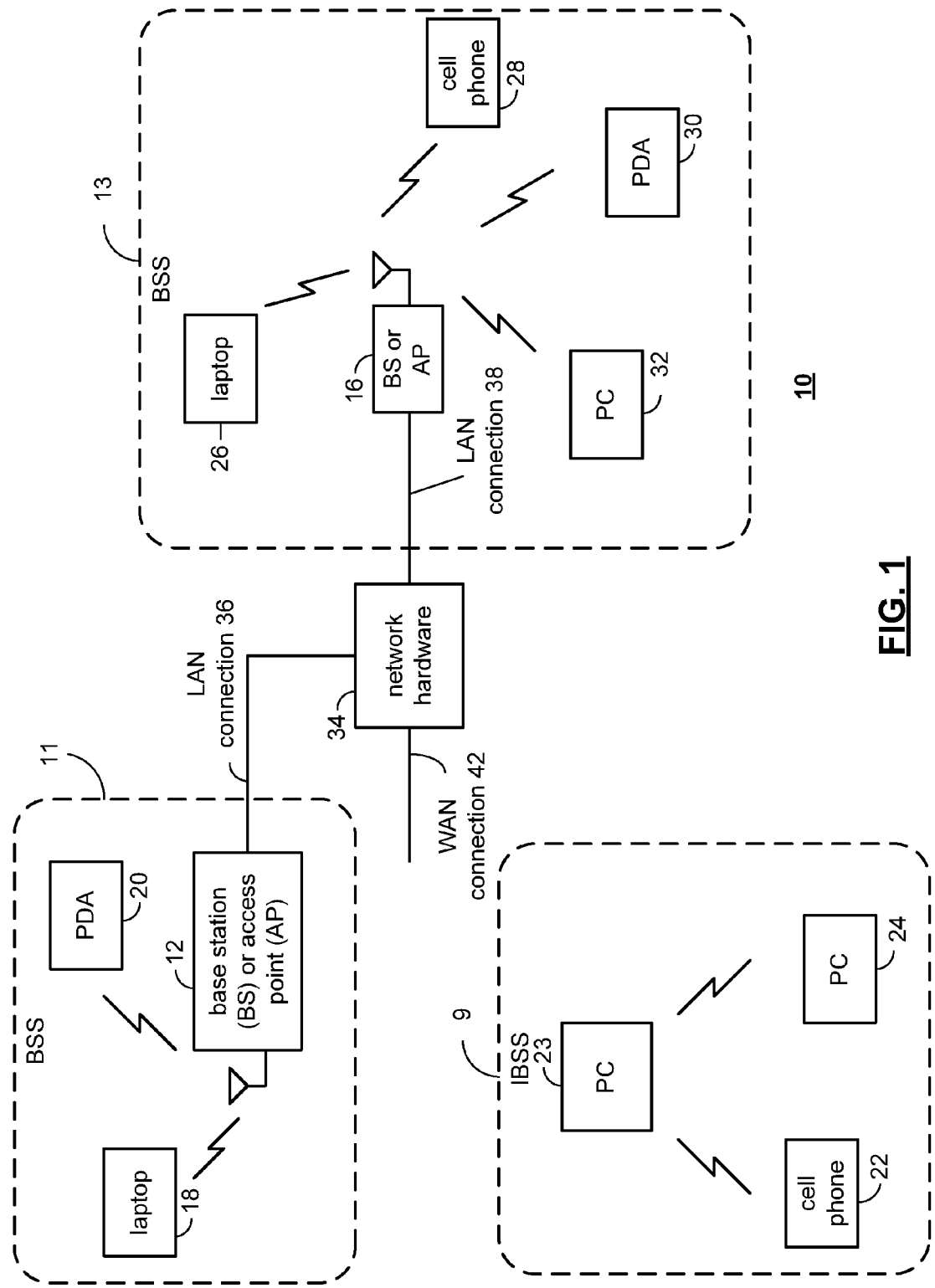
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless transceiver. The details of the wireless transceiver will be described in greater detail with reference to FIGS. 3 and 15-17.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
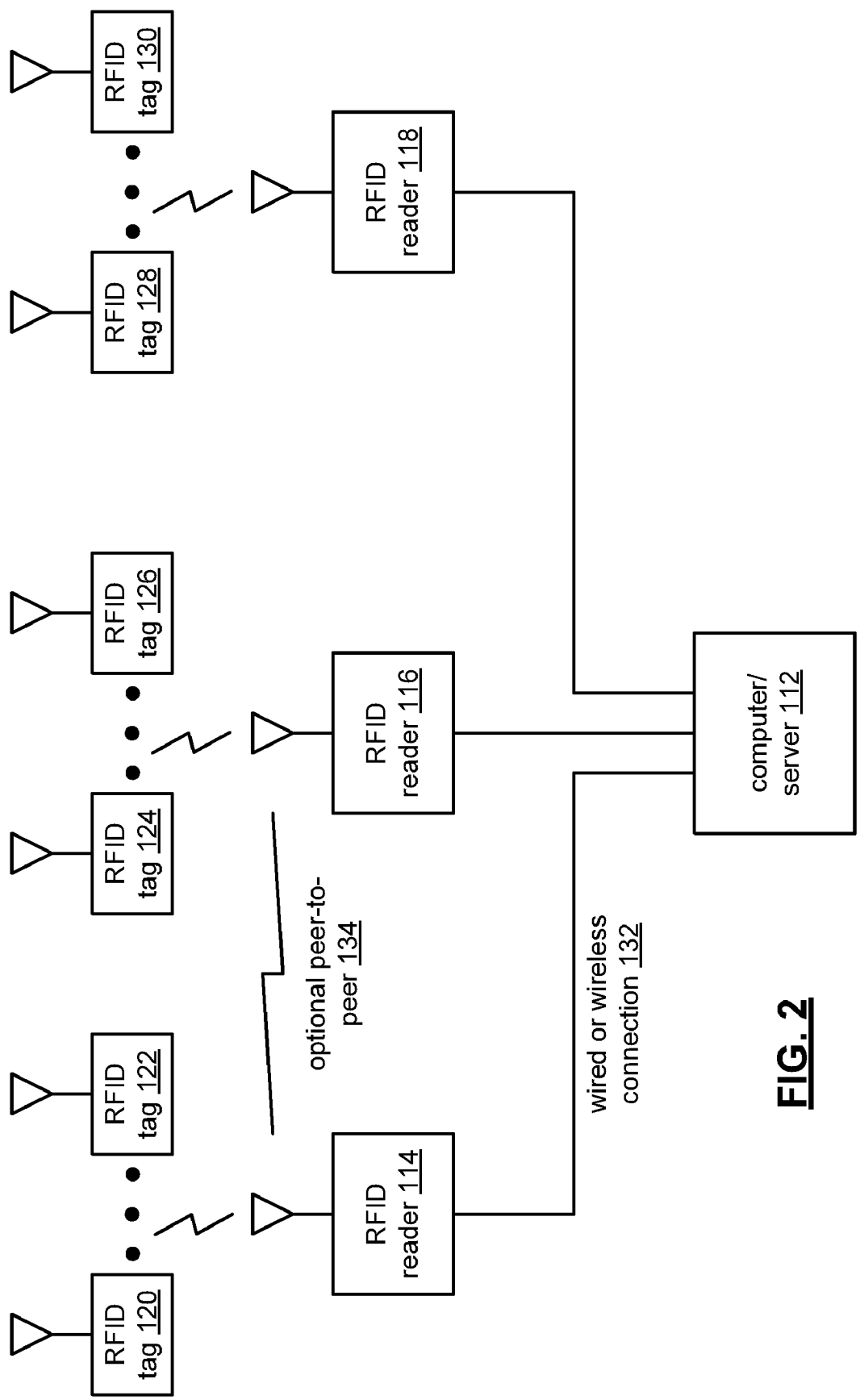
FIG. 2 is a schematic block diagram of a radio frequency identification system in accordance with the present invention.

FIG. 2 is a schematic block diagram of an RFID (radio frequency identification) system that includes a computer/server 112, a plurality of RFID readers 114-118 and a plurality of RFID tags 120-130. The RFID tags 120-130 may each be associated with a particular object for a variety of purposes including, but not limited to, tracking inventory, tracking status, location determination, assembly progress, et cetera.

Each RFID reader 114-118 wirelessly communicates with one or more RFID tags 120-130 within its coverage area. For example, RFID reader 114 may have RFID tags 120 and 122 within its coverage area, while RFID reader 116 has RFID tags 124 and 126, and RFID reader 118 has RFID tags 128 and 130 within its coverage area. The RF communication scheme between the RFID readers 114-118 and RFID tags 120-130 may be a backscattering technique whereby the RFID readers 114-118 provide energy to the RFID tags via an RF signal. The RFID tags derive power from the RF signal and respond on the same RF carrier frequency with the requested data.

In this manner, the RFID readers 114-118 collect data as may be requested from the computer/server 112 from each of the RFID tags 120-130 within its coverage area. The collected data is then conveyed to computer/server 112 via the wired or wireless connection 132 and/or via the peer-to-peer communication 134. In addition, and/or in the alternative, the computer/server 112 may provide data to one or more of the RFID tags 120-130 via the associated RFID reader 114-118. Such downloaded information is application dependent and may vary greatly. Upon receiving the downloaded data, the RFID tag would store the data in a non-volatile memory.

As indicated above, the RFID readers 114-118 may optionally communicate on a peer-to-peer basis such that each RFID reader does not need a separate wired or wireless connection 132 to the computer/server 112. For example, RFID reader 114 and RFID reader 116 may communicate on a peer-to-peer basis utilizing a back scatter technique, a wireless LAN technique, and/or any other wireless communication technique. In this instance, RFID reader 116 may not include a wired or wireless connection 132 to computer/server 112. Communications between RFID reader 116 and computer/server 112 are conveyed through RFID reader 114 and the wired or wireless connection 132, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 2 may be expanded to include a multitude of RFID readers 114-118 distributed throughout a desired location (for example, a building, office site, et cetera) where the RFID tags may be associated with equipment, inventory, personnel, et cetera. Note that the computer/server 112 may be coupled to another server and/or network connection to provide wide area network coverage.

Figure 3:
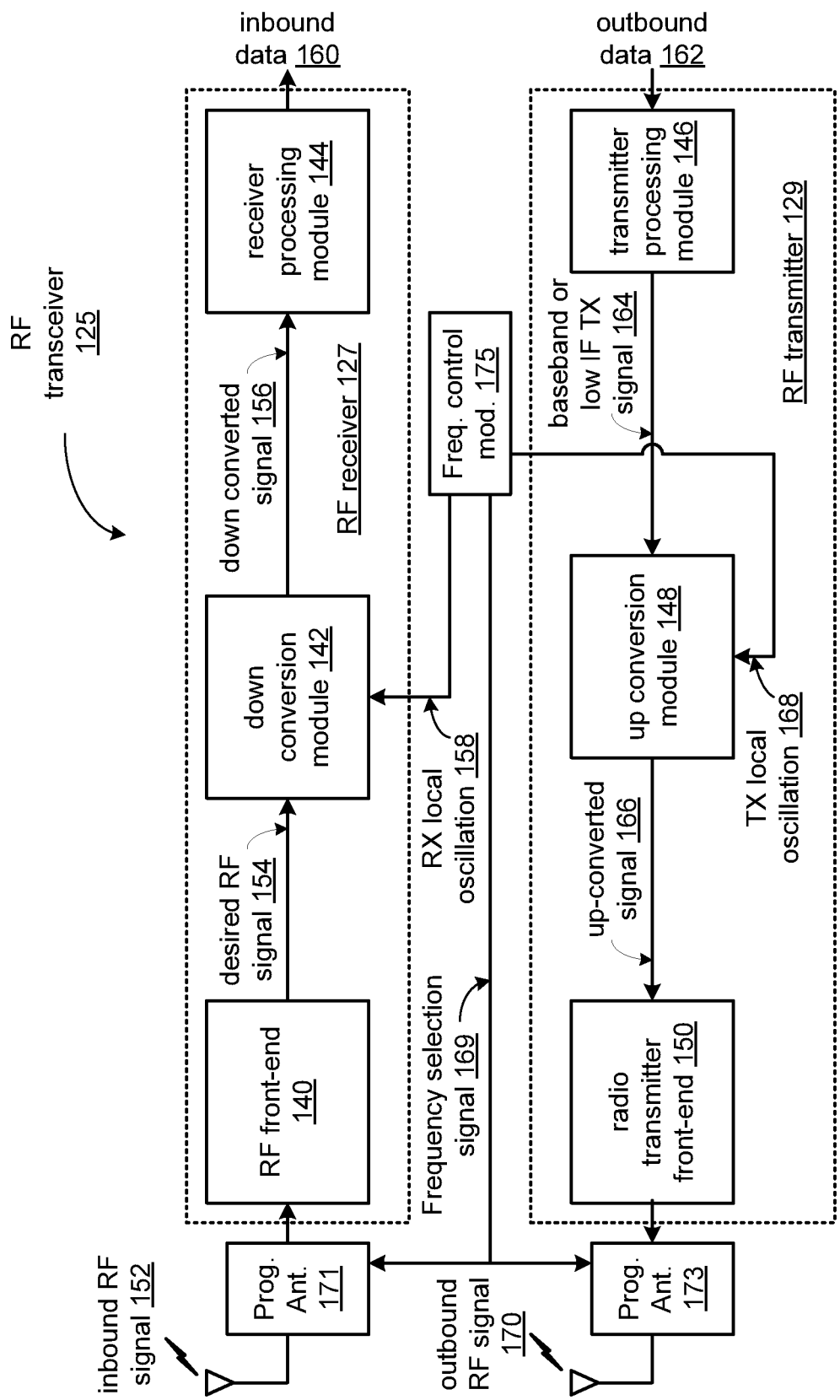
FIG. 3 is a schematic block diagram of an RF transceiver in accordance with the present invention.

FIG. 3 is a schematic block diagram of a wireless transceiver, which may be incorporated in an access point or base station 12 and 16 of FIG. 1, in one or more of the wireless communication devices 18-32 of FIG. 1, in one or more of the RFID readers 114-118, and/or in one or more of RFID tags 120-130. The RF transceiver 125 includes an RF transmitter 129, an RF receiver 127 and a frequency control module 175. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to a programmable antenna (171, 173), however, the receiver and transmitter may share a single antenna via a transmit/receive switch and/or transformer balun. In another embodiment, the receiver and transmitter may share a diversity antenna structure that includes two or more antenna such as programmable antennas 171 and 173. In another embodiment, the receiver and transmitter may each use its own diversity antenna structure that include two or more antennas such as programmable antennas 171 and 173. In another embodiment, the receiver and transmitter may share a multiple input multiple output (MIMO) antenna structure that includes a plurality of programmable antennas (171, 173). Accordingly, the antenna structure of the wireless transceiver will depend on the particular standard(s) to which the wireless transceiver is compliant.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier 84 and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device.

The receiver receives inbound RF signals 152 via the antenna structure, where a base station, an access point, or another wireless communication device transmitted the inbound RF signals 152. The antenna structure provides the inbound RF signals 152 to the receiver front-end 140, which will be described in greater detail with reference to FIGS. 4-7. In general, without the use of bandpass filters, the receiver front-end 140 blocks one or more undesired signals components 174 (e.g., one or more interferers) of the inbound RF signal 152 and passing a desired signal component 172 (e.g., one or more desired channels of a plurality of channels) of the inbound RF signal 152 as a desired RF signal 154.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Frequency control module 175 controls a frequency of the transmitter local oscillation and a frequency of the receiver local oscillation, in accordance with a desired carrier frequency. In an embodiment of the present invention, frequency control module includes a transmit local oscillator and a receive local oscillator that can operate at a plurality of selected frequencies corresponding to a plurality of carrier frequencies of the outbound RF signal 170. In addition, frequency control module 175 generates a frequency selection signal that indicates the current selection for the carrier frequency. In operation, the carrier frequency can be predetermined or selected under user control. In alternative embodiments, the frequency control module can change frequencies to implement a frequency hopping scheme that selectively controls the carrier frequency to a sequence of carrier frequencies. In a further embodiment, frequency control module 175 can evaluate a plurality of carrier frequencies and select the carrier frequency based on channel characteristics such as a received signal strength indication, signal to noise ratio, signal to interference ratio, bit error rate, retransmission rate, or other performance indicator.

In an embodiment of the present invention, frequency control module 175 includes a processing module that performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, programmable antennas 171 and 173 are dynamically tuned to the particular carrier frequency or sequence of selected frequencies indicated by the frequency selection signal 169. In this fashion, the performance of each of these antennas can be optimized (in terms of performance measures such as impedance matching, gain and/or bandwidth) for the particular carrier frequency that is selected at any given point in time. Further details regarding the programmable antennas 171 and 173 including various implementations and uses are presented in conjunction with the FIGS. 4-24 that follow.

Figure 4:
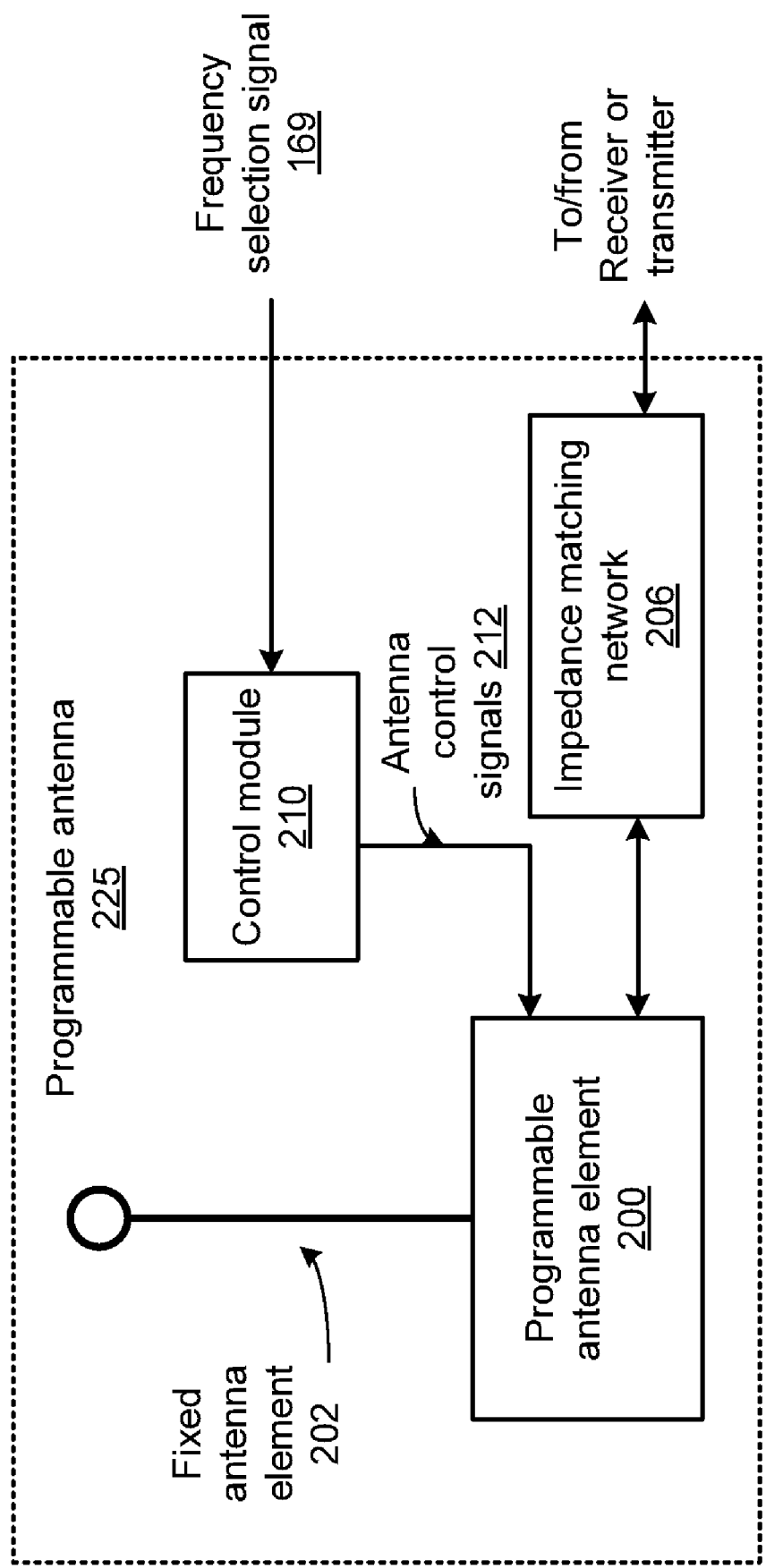
FIG. 4 is a schematic block diagram of an embodiment of a programmable antenna in accordance with the present invention.

FIG. 4 is a schematic block diagram of an embodiment of a programmable antenna in accordance with the present invention. In particular, a programmable antenna 225 is presented that includes an antenna having a fixed antenna element 202 and a programmable antenna element 200. The programmable antenna 225 further includes a control module 210 and an impedance matching network 206. In operation, the programmable antenna 225 is tunable to one of a plurality of resonant frequencies in response to a frequency selection signal 169.

The programmable antenna element 200 is coupled to the fixed antenna element 202 and is tunable to a particular resonant frequency in response to one or more antenna control signals 212. In this fashion, programmable antenna 225 can be dynamically tuned to a particular carrier frequency or sequence of carrier frequencies of a transmitted RF signal and/or of a received RF signal. In an embodiment of the present invention, the fixed antenna element 202 has a resonant frequency or center frequency of operation that is dependent upon the physical dimensions of the fixed antenna element, such as a length of a one-quarter wavelength antenna element or other dimension. Programmable antenna element 200 modifies the "effective" length or dimension of the overall antenna by selectively adding or subtracting from the reactance of the programmable antenna element 200 to conform to changes in the selected frequency and the corresponding changes in wavelength. The fixed antenna element 202 can include one or more elements in combination that each can be a dipole, loop, annular slot or other slot configuration, rectangular aperture, circular aperture, line source, helical element or other element or antenna configuration. The programmable antenna element 200 can be implemented with an adjustable impedance having a reactance, and optionally a resistive component, that each can be programmed to any one of a plurality of values. Further details regarding additional implementations of programmable antenna element 200 are presented in conjunction with FIGS. 6-11 and 14 that follow.

Programmable antenna 225 optionally includes impedance matching network 206 that couples the programmable antenna 225 to and from a receiver or transmitter, either directly or through a transmission line. Impedance matching network 225 attempts to maximize the power transfer between the antenna and the receiver or between the transmitter and the antenna, to minimize reflections and/or standing wave ratio, and/or to bridge the impedance of the antenna to the receiver and/or transmitter or vice versa. In an embodiment of the present invention, the impedance matching network 206 includes a transformer such as a balun transformer, an L-section, pi-network, t-network or other impedance network that performs the function of impedance matching.

Control module 210 generates the one or more antenna control signals 212 in response to a frequency selection signal. In an embodiment of the present invention, control module 210 produces antenna control signals 212 to command the programmable antenna element to modify its impedance in accordance with a desired resonant frequency or the particular carrier frequency that is indicated by the frequency selection signal 169. For instance, in the event that frequency selection signal indicates a particular carrier frequency corresponding to a particular 802.11 channel of the 2.4 GHz band, the control module generates antenna control signals 212 that command the programmable antenna element 200 to adjust its impedance such that the overall resonant frequency of the programmable antenna, including both the fixed antenna element 202 and programmable antenna element 200 is equal to, substantially equal to or as close as possible to the selected carrier frequency.

In one mode of operation, the set of possible carrier frequencies is known in advance and the control module 210 is preprogrammed with the particular antenna control signals 212 that correspond to each carrier frequency, so that when a particular carrier frequency is selected, logic or other circuitry or programming such as via a look-up table can be used to retrieve the particular antenna control signals required for the selected frequency. In a further mode of operation, the control module 210, based on equations derived from impedance network principles that will be apparent to one of ordinary skill in the art when presented the disclosure herein, calculates the particular impedance that is required of programmable antenna network 200 and generates antenna control commands 212 to implement this particular impedance.

In an embodiment of the present invention, control module 210 includes a processing module that performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 5:
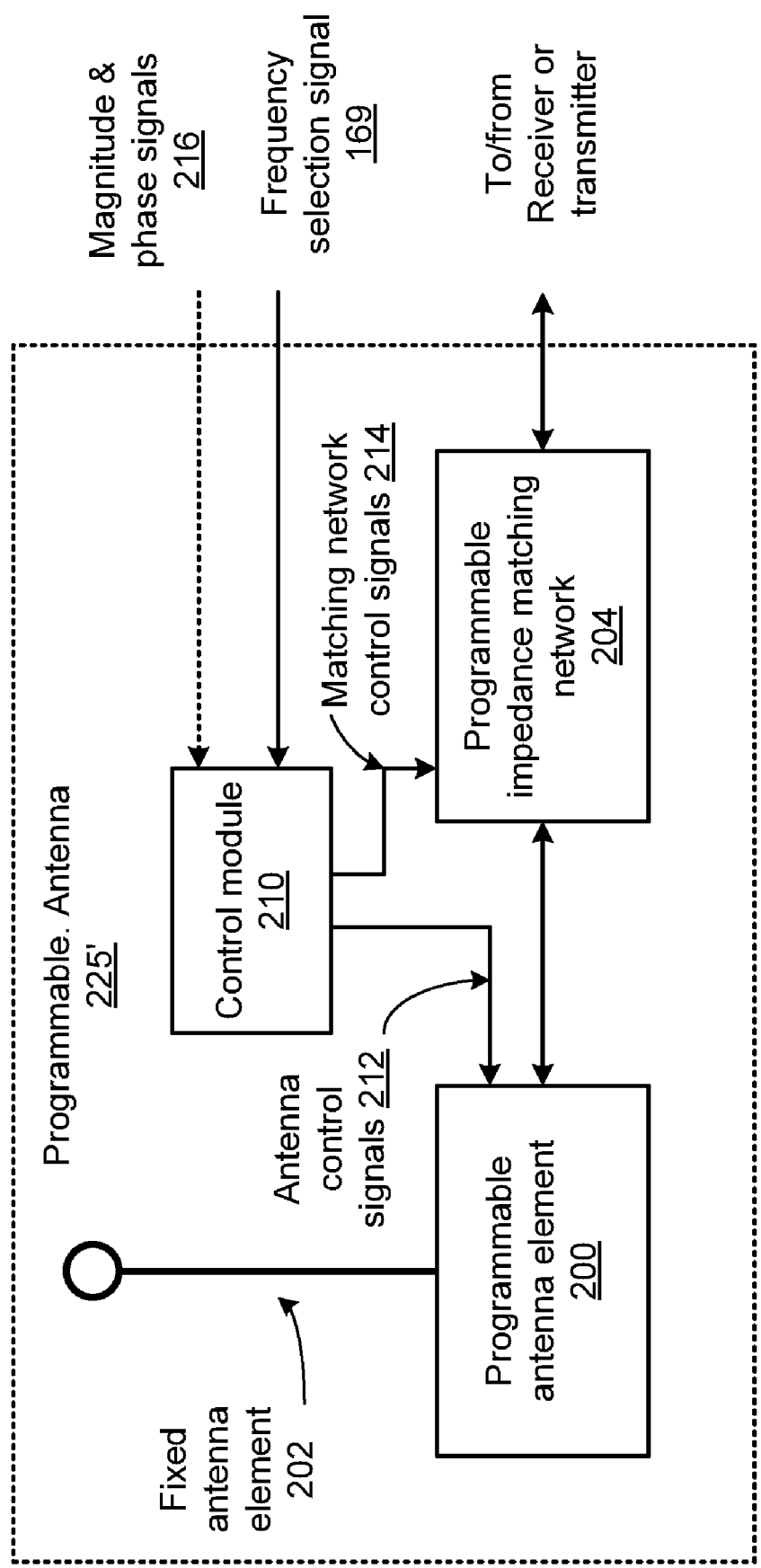
FIG. 5 is a schematic block diagram of an embodiment of a programmable antenna in accordance with the present invention.

FIG. 5 is a schematic block diagram of an embodiment of a programmable antenna in accordance with the present invention. In particular, a programmable antenna 225' is shown that includes many common elements of programmable antenna 225 that are referred to by common reference numerals. In place of optional impedance matching network 206, programmable antenna 225' includes a programmable impedance matching network 204 that is tunable in response to one or more matching network control signals 214 generated by control module 210, to provide a substantially constant load impedance. In this fashion, changes to the overall impedance of the programmable antenna caused by variations in the impedance of the programmable antenna element 200 can be compensated by adjusting the programmable impedance matching network 204 at the same time. In addition or in the alternative, control module 210 can optionally adjust the impedance of programmable impedance matching network 204 to control the magnitude and phase of the antenna current of the programmable antenna based on magnitude and phase signals 216, or to adjust the magnitude and phase of the antenna current received from the programmable antenna to support applications such as implementation of programmable antenna 225' as part of a phased array antenna system.

As discussed in conjunction with the generation of the antenna control signals 212, control module 210 can be implemented with a processing device that retrieves the particular matching network control signals 214 in response to the particular frequency, magnitude and/or phase that are selected via frequency selection signal 169 and magnitude and phase signals 216 or calculates the particular matching network control signals 214 in real-time based on network equations and the particular frequency, magnitude and/or phase that are selected.

Figure 12:
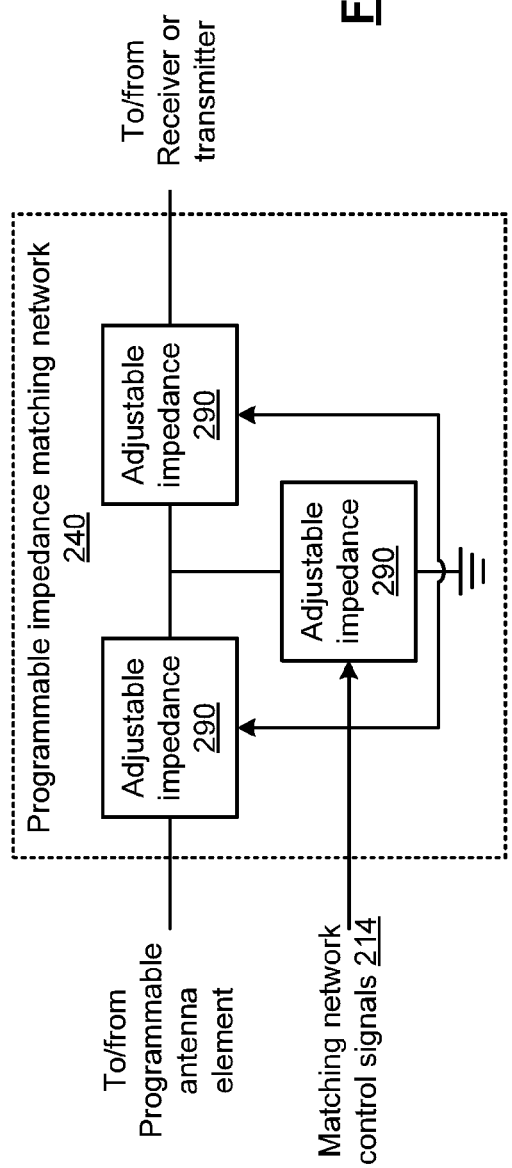
FIG. 12 is a schematic block diagram of an embodiment of a programmable impedance matching network in accordance with the present invention.
Figure 13:
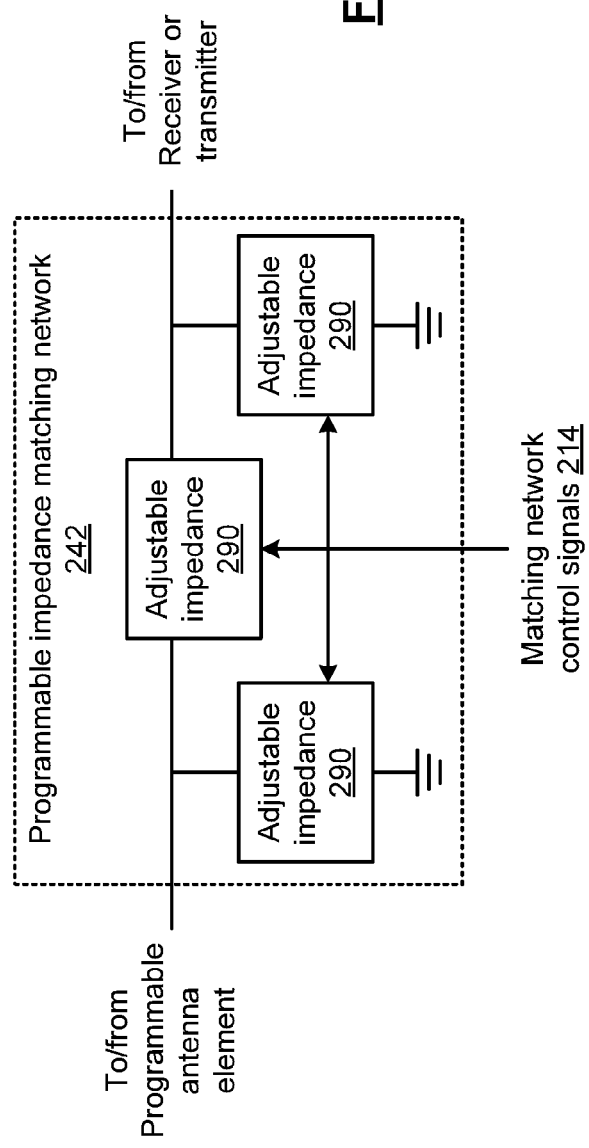
FIG. 13 is a schematic block diagram of an embodiment of a programmable impedance matching network in accordance with the present invention.
Figure 14:
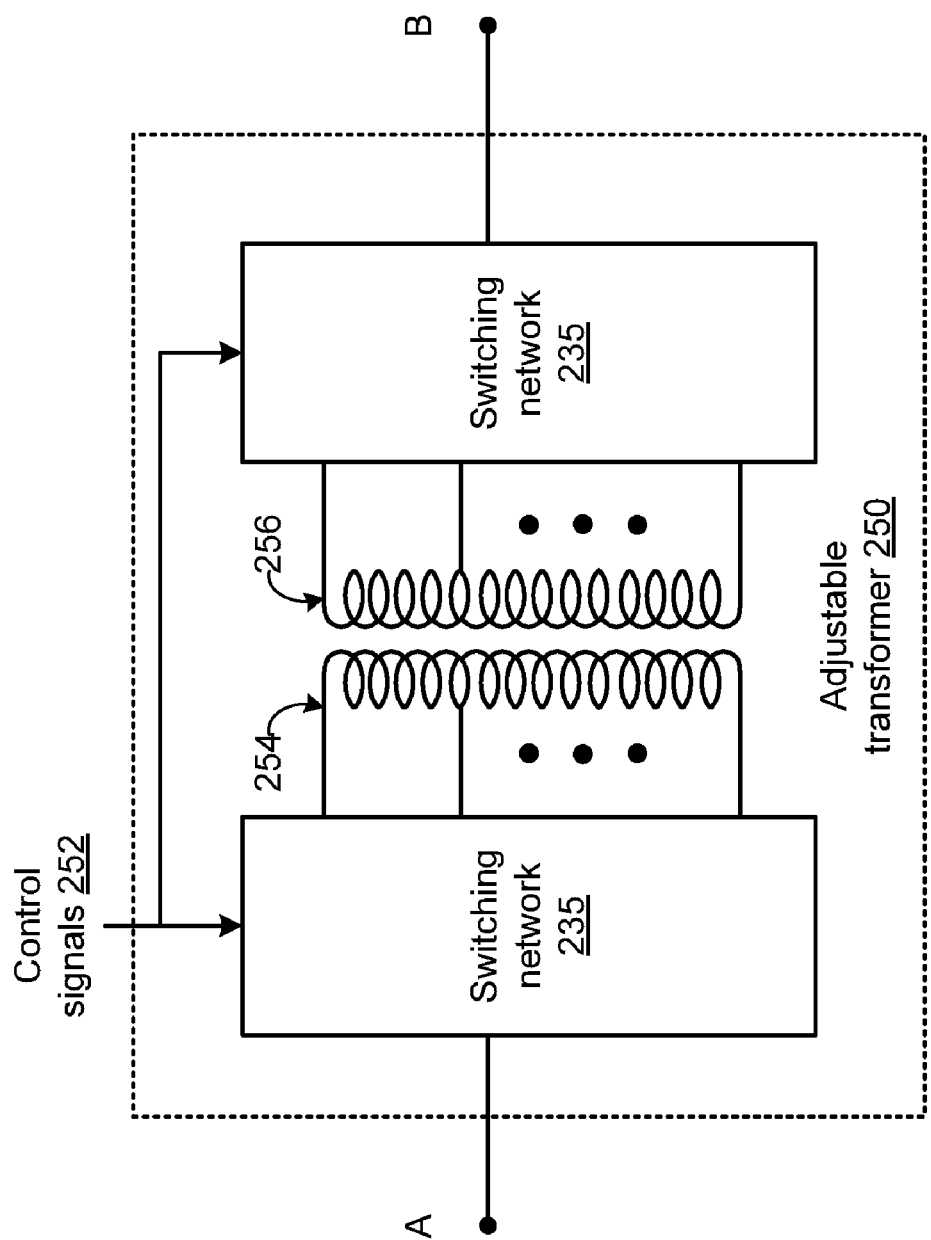
FIG. 14 is a schematic block diagram of an embodiment of an adjustable transformer in accordance with the present invention.

Further additional implementations of programmable impedance matching network 204 are presented in conjunction with FIGS. 12-14.

Figure 6:
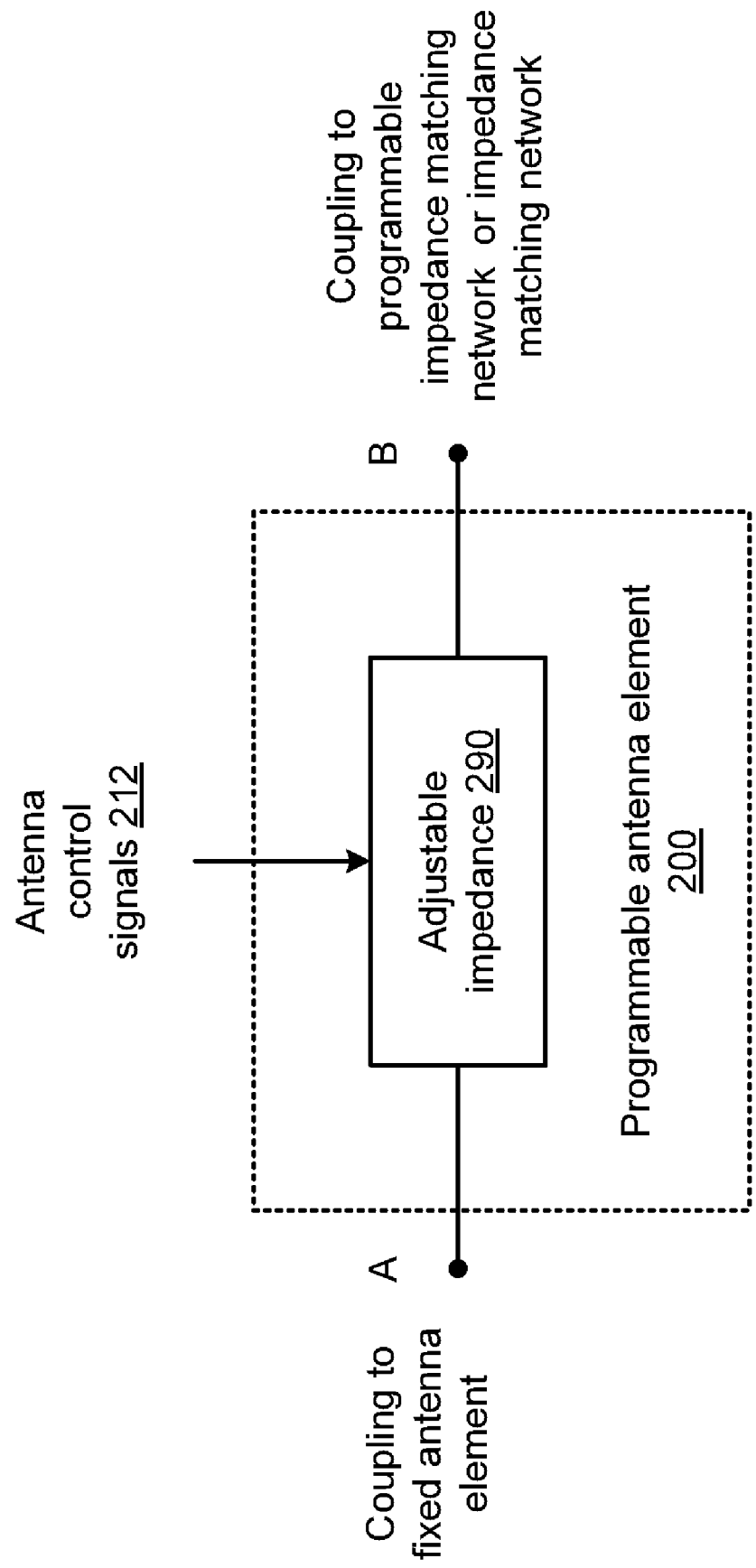
FIG. 6 is a schematic block diagram of an embodiment of a programmable antenna element in accordance with the present invention.

FIG. 6 is a schematic block diagram of an embodiment of a programmable antenna element in accordance with the present invention. In particular, programmable antenna element 200 is shown that includes an adjustable impedance 290 that is adjustable in response to antenna control signal 212. Adjustable impedance 290 is a complex impedance with an adjustable reactance and optionally a resistive component that is also adjustable. Adjustable impedance can include at least one adjustable reactive element such as an adjustable inductor, an adjustable capacitor, an adjustable tank circuit, an adjustable transformer such as a balun transformer or other adjustable impedance network or network element. Several additional implementations of adjustable impedance 290 are presented in conjunction with FIGS. 7-11 and 14 that follow.

Figure 7:
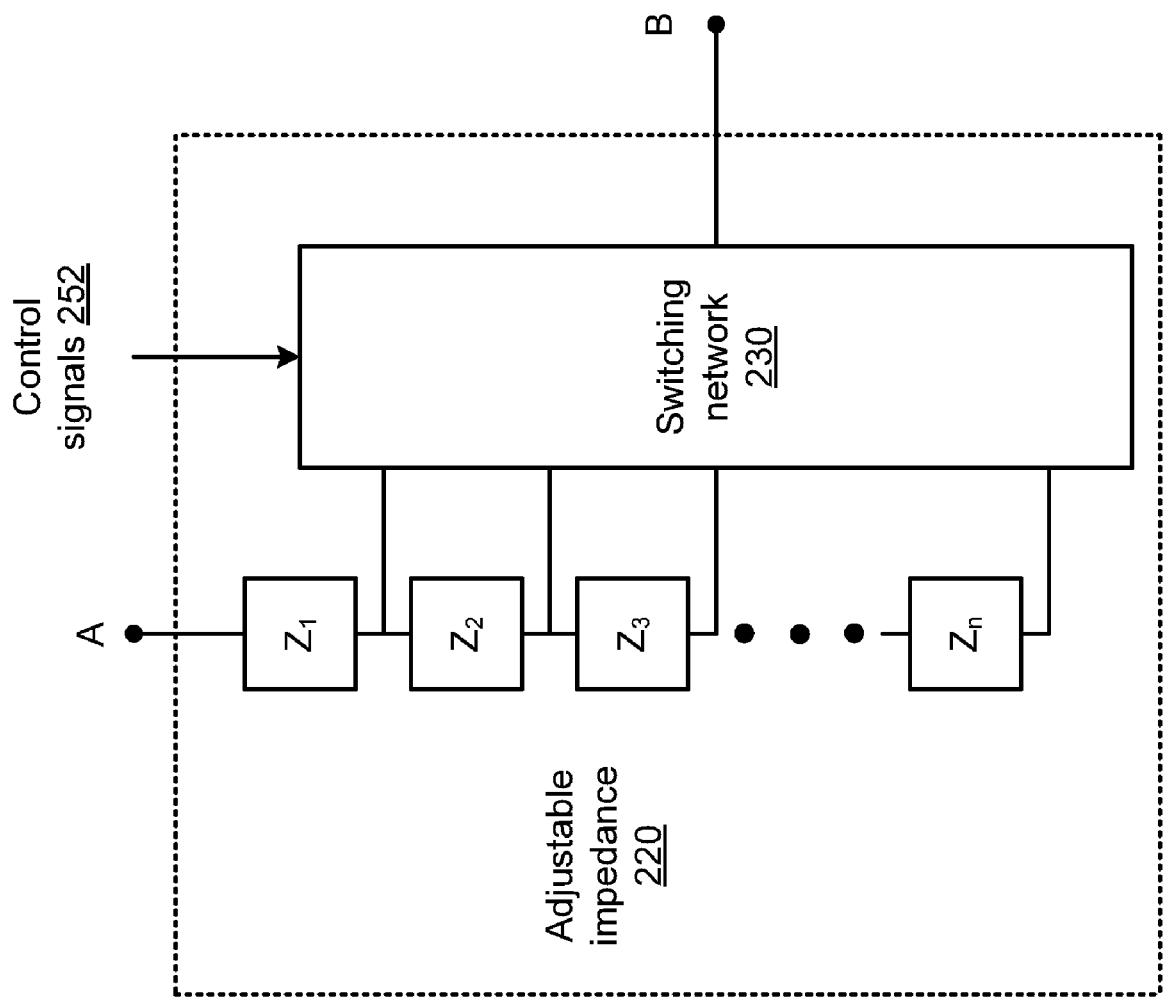
FIG. 7 is a schematic block diagram of an embodiment of an adjustable impedance in accordance with the present invention.

FIG. 7 is a schematic block diagram of an embodiment of an adjustable impedance in accordance with the present invention. An adjustable impedance 220 is shown that includes a plurality of fixed network elements $Z_1, Z_2, Z_3, \ldots Z_n$ such as resistors, or reactive network elements such as capacitors, and/or inductors. A switching network 230 selectively couples the plurality of fixed network elements in response to one or more control signals 252, such as antenna control signals 212. In operation, the switching network 230 selects at least one of the plurality of fixed reactive network elements and that deselects the remaining ones of the plurality of fixed reactive network elements in response to the control signals 252. In particular, switching network 230 operates to couple one of the plurality of taps to terminal B. In this fashion, the impedance between terminals A and B is adjustable to include a total impedance $Z_1, Z_1+Z_2, Z_1+Z_2+Z_3$, etc, based on the tap selected. Choosing the fixed network elements $Z_1, Z_2, Z_3, \ldots Z_n$ to be a plurality of inductors, allows the adjustable impedance 220 to implement an adjustable inductor having a range from ($Z_1$ to $Z_1+Z_2+Z_3+\ldots+Z_n$). Similarly, choosing the fixed network elements $Z_1, Z_2, Z_3, \ldots Z_n$ to be a plurality of capacitors, allows the adjustable impedance 220 to implement an adjustable capacitor, etc.

Figure 8:
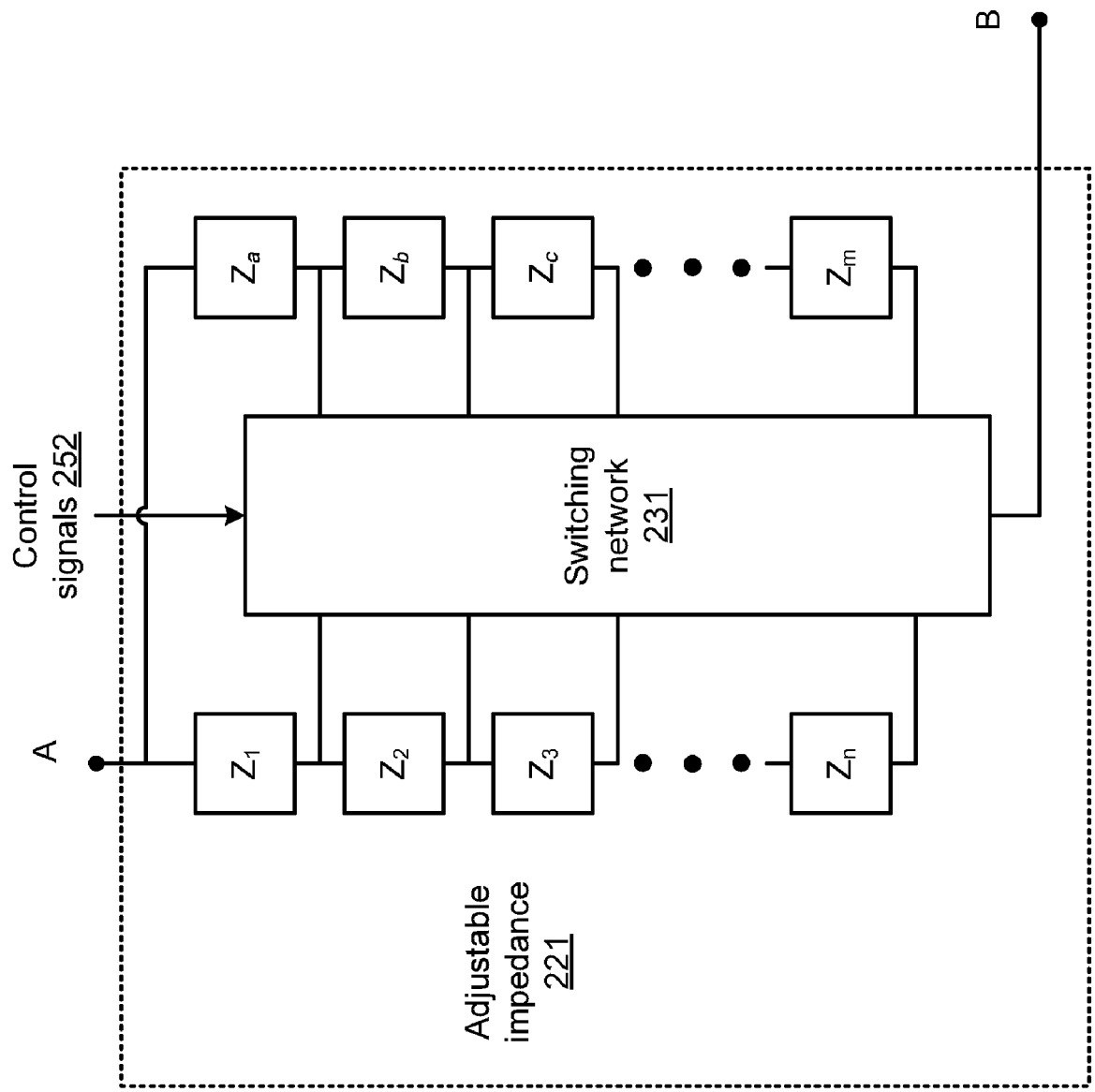
FIG. 8 is a schematic block diagram of an embodiment of an adjustable impedance in accordance with the present invention.

FIG. 8 is a schematic block diagram of an embodiment of an adjustable impedance in accordance with the present invention. An adjustable impedance 221 is shown that includes a plurality of group A fixed network elements $Z_1, Z_2, Z_3, \ldots Z_n$ and group B fixed network elements $Z_a, Z_b, Z_c, \ldots Z_m$ such as resistors, or reactive network elements such as capacitors, and/or inductors. A switching network 231 selectively couples the plurality of fixed network elements in response to one or more control signals 252, such as antenna control signals 212 to form a parallel combination of two adjustable impedances. In operation, the switching network 231 selects at least one of the plurality of fixed reactive network elements and that deselects the remaining ones of the plurality of fixed reactive network elements in response to the control signals 252. In particular, switching network 231 operates to couple one of the plurality of taps from the group A impedances to one of the plurality of taps of the group B impedances to the terminal B. In this fashion, the impedance between terminals A and B is adjustable and can be to form a parallel circuit such as parallel tank circuit having a total impedance equal to the parallel combination between a group A impedance $Z_A=Z_1$, $Z_1+Z_2$, or $Z_1+Z_2+Z_3$, etc., and a Group B impedance $Z_B=Z_a$, $Z_a+Z_b$, or $Z_a+Z_b+Z_c$, etc., based on the taps selected.

Figure 9:
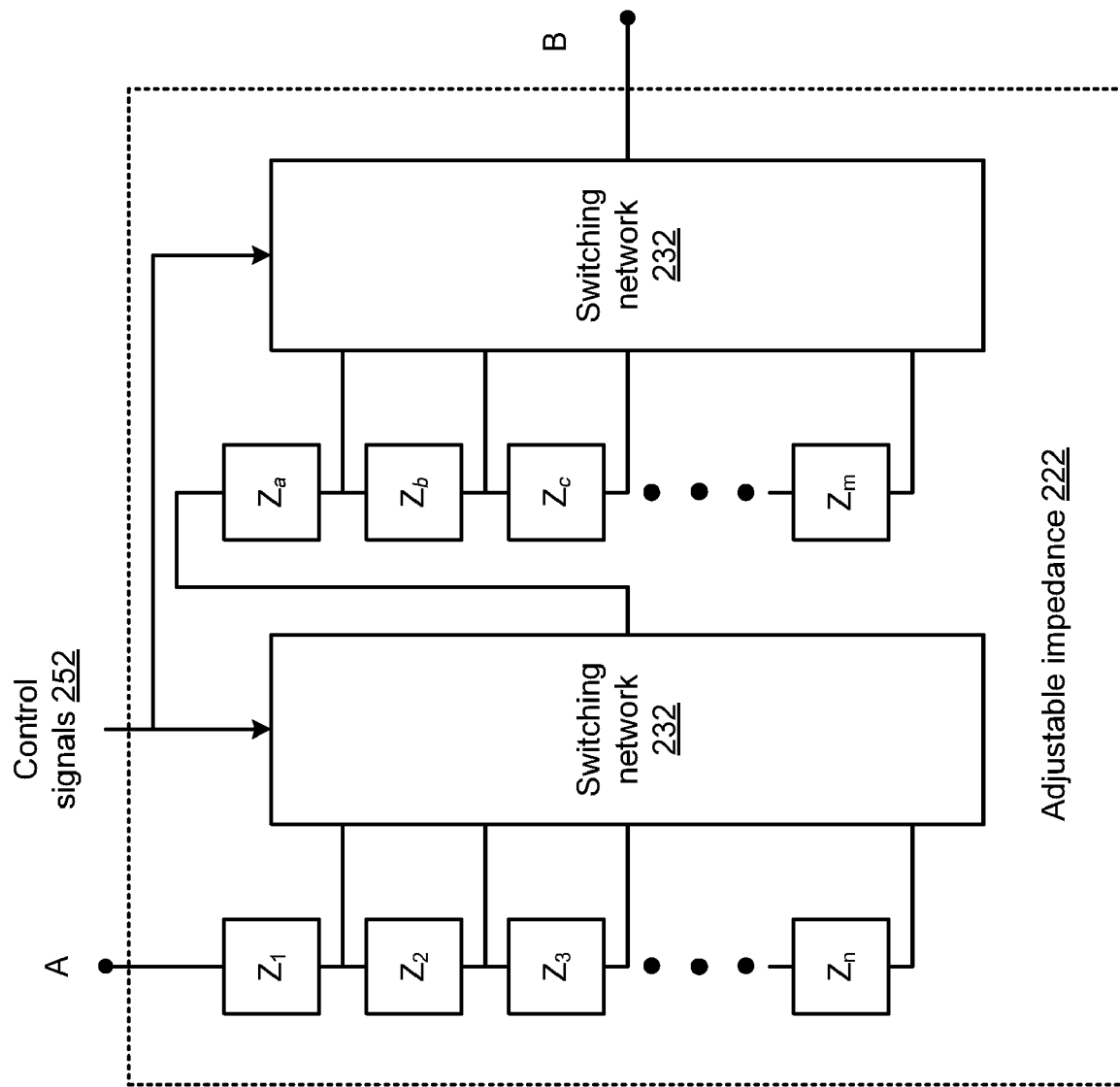
FIG. 9 is a schematic block diagram of an embodiment of an adjustable impedance in accordance with the present invention.

FIG. 9 is a schematic block diagram of an embodiment of an adjustable impedance in accordance with the present invention. An adjustable impedance 222 is shown that includes a plurality of group A fixed network elements $Z_1$, $Z_2$, $Z_3$, ... $Z_n$ and group B fixed network elements $Z_a$, $Z_b$, $Z_c$, ... $Z_m$ such as resistors, or reactive network elements such as capacitors, and/or inductors. A switching network 232 selectively couples the plurality of fixed network elements in response to one or more control signals 252, such as antenna control signals 212 to form a series combination of two adjustable impedances. In operation, the switching network 232 selects at least one of the plurality of fixed reactive network elements and that deselects the remaining ones of the plurality of fixed reactive network elements in response to the control signals 252. In particular, switching network 232 operates to couple one of the plurality of taps from the group A impedances to the group B impedances and one of the plurality of taps of the group B impedances to the terminal B. In this fashion, the impedance between terminals A and B is adjustable and can be to form a series circuit such as series tank circuit having a total impedance equal to the series combination between a group A impedance $Z_A=Z_1$, $Z_1+Z_2$, or $Z_1+Z_2+Z_3$, etc., and a Group B impedance $Z_B=Z_a$, $Z_a+Z_b$, or $Z_a+Z_b+Z_c$, etc., based on the taps selected.

Figure 10:
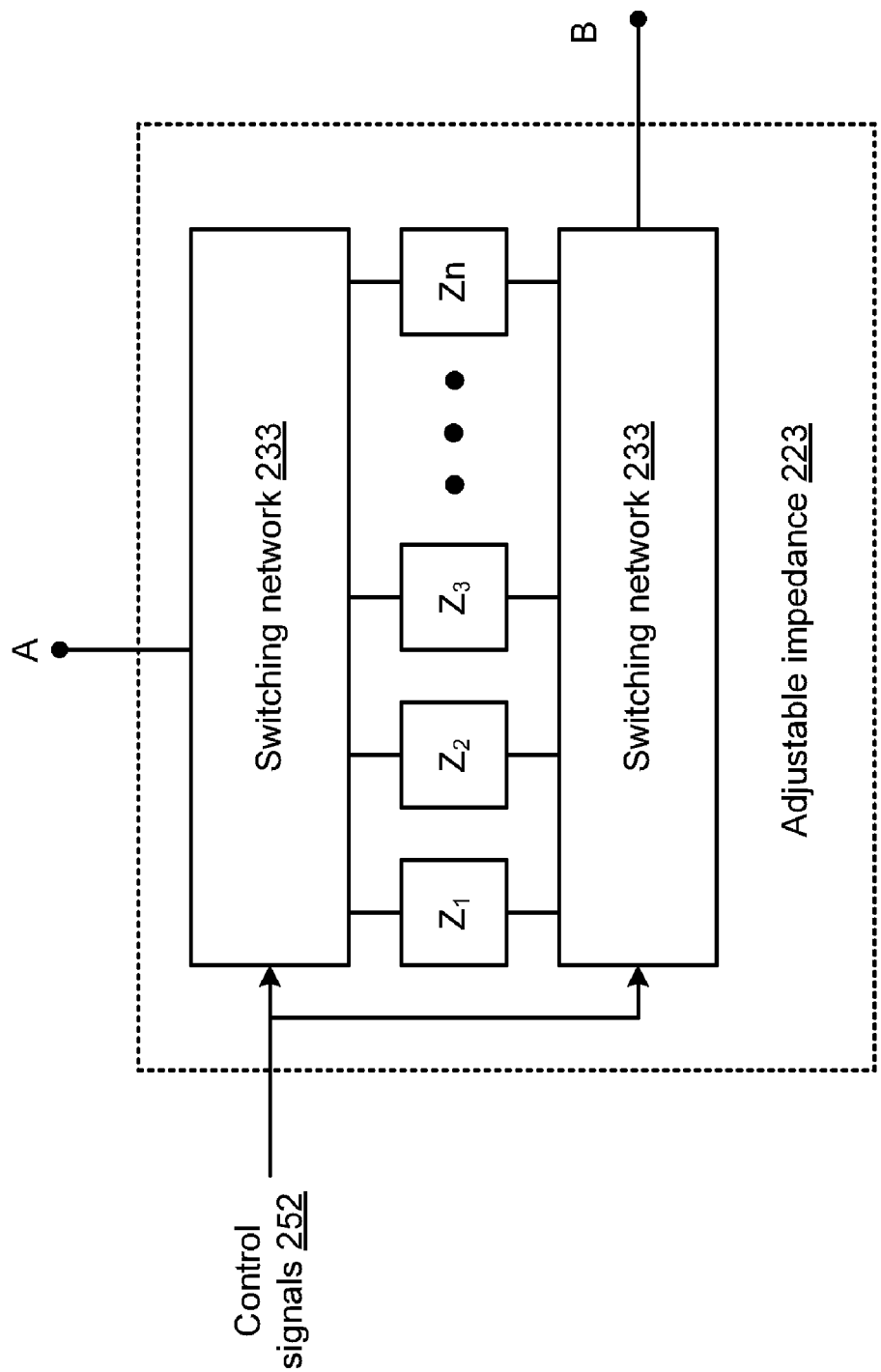
FIG. 10 is a schematic block diagram of an embodiment of an adjustable impedance in accordance with the present invention.

FIG. 10 is a schematic block diagram of an embodiment of an adjustable impedance in accordance with the present invention. An adjustable impedance 223 is shown that includes a plurality of fixed network elements $Z_1$, $Z_2$, $Z_3$, ... $Z_n$ such as resistors, or reactive network elements such as capacitors, and/or inductors. A switching network 233 selectively couples the plurality of fixed network elements in response to one or more control signals 252, such as antenna control signals 212. In operation, the switching network 233 selects at least one of the plurality of fixed reactive network elements and that deselects the remaining ones of the plurality of fixed reactive network elements in response to the control signals 252. In particular, switching network 233 operates to couple one of the plurality of taps of the top legs of the selected elements to terminal A and the corresponding bottom legs of the selected elements to terminal B. In this fashion, the impedance between terminals A and B is adjustable to include a total impedance that is the parallel combination of the selected fixed impedances. Choosing the fixed network elements $Z_1$, $Z_2$, $Z_3$, ... $Z_n$ to be a plurality of inductances, allows the adjustable impedance 220 to implement an adjustable inductor, from the range from the parallel combination of $(Z_1, Z_2, Z_3, ... Z_n)$ to $MAX(Z_1, Z_2, Z_3 ... Z_n)$. Also, the fixed network elements $Z_1$, $Z_2$, $Z_3$, ... $Z_n$ can be chosen as a plurality of capacitances.

Figure 11:
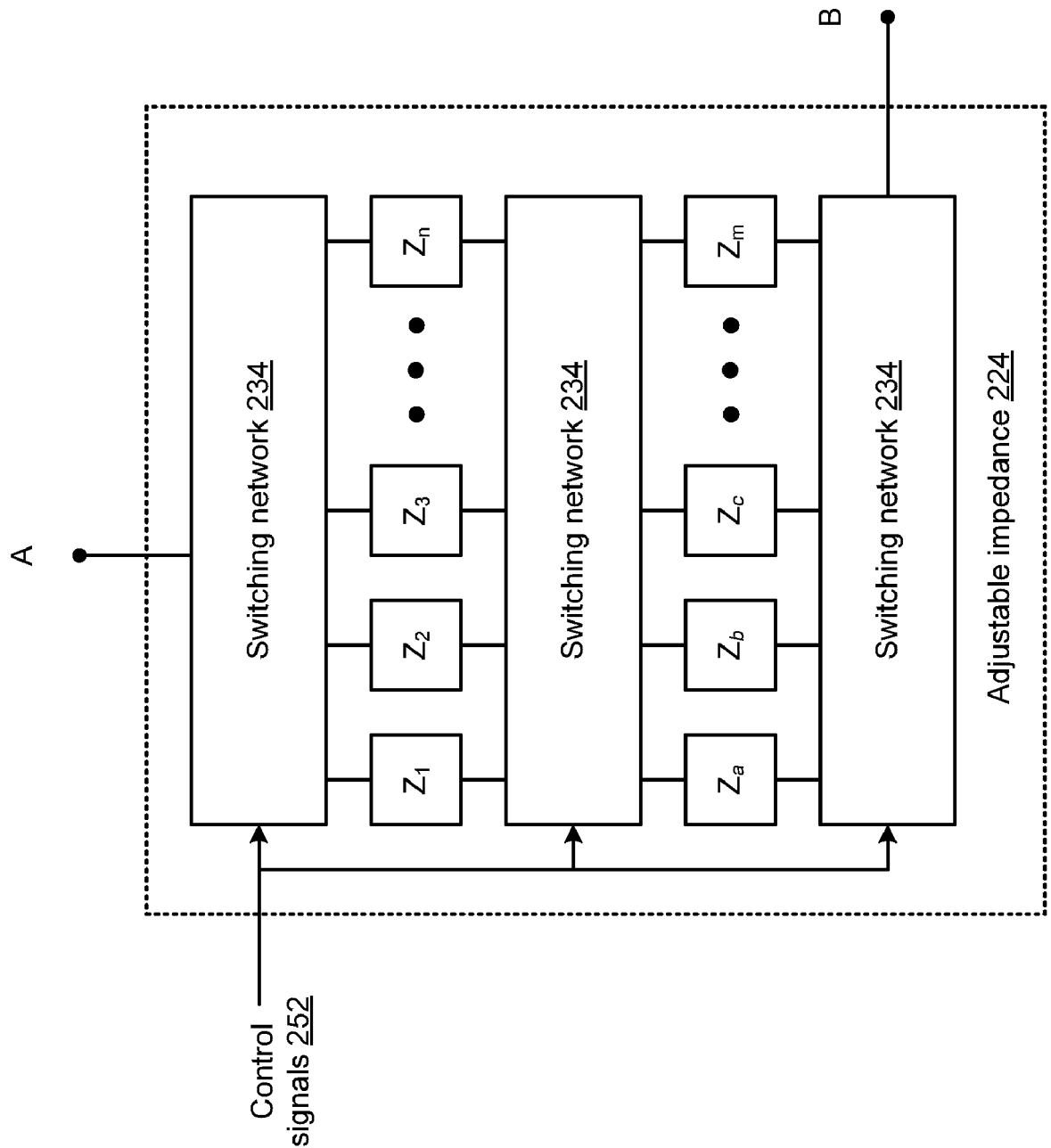
FIG. 11 is a schematic block diagram of an embodiment of an adjustable impedance in accordance with the present invention.

FIG. 11 is a schematic block diagram of an embodiment of an adjustable impedance in accordance with the present invention. An adjustable impedance 224 is shown that includes a plurality of group A fixed network elements $Z_1$, $Z_2$, $Z_3$, ... $Z_n$ and group B fixed network elements $Z_a$, $Z_b$, $Z_c$, ... $Z_m$ such as resistors, or reactive network elements such as capacitors, and/or inductors. A switching network 234 selectively couples the plurality of fixed network elements in response to one or more control signals 252, such as antenna control signals 212 to form a series combination of two adjustable impedances. In operation, the switching network 234 selects at least one of the plurality of fixed reactive network elements and that deselects the remaining ones of the plurality of fixed reactive network elements in response to the control signals 252. In particular, switching network 232 operates to couple a selected parallel combination of impedances from the group A in series with a selected parallel combination of group B impedances. In this fashion, the impedance between terminals A and B is adjustable and can be to form a series circuit such as series tank circuit having a total impedance equal to the series combination between a group A impedance $Z_A$ and a Group B impedance $Z_B$, based on the taps selected.

FIG. 12 is a schematic block diagram of an embodiment of a programmable impedance matching network in accordance with the present invention. A programmable impedance matching network 240 is shown that includes a plurality of adjustable impedances 290, responsive to matching control signals 214. In particular, each of the adjustable impedances 290 can be implemented in accordance with any of the adjustable impedances discussed in association with the impedances used to implement programmable antenna element 200 discussed in FIGS. 7-11, with the control signals 252 being supplied by matching network control signal 214, instead of antenna control signals 212. In the configuration shown, a t-network configuration is implemented with three adjustable impedances, however, one or more these adjustable impedances can alternatively be replaced by an open-circuit or short circuit to produce other configurations including an L-section matching network. Further, one or more of the adjustable impedances 290 can be replaced by fixed impedances, such as resistors, or fixed reactive network elements.

FIG. 13 is a schematic block diagram of an embodiment of a programmable impedance matching network in accordance with the present invention. A programmable impedance matching network 242 is shown that includes a plurality of adjustable impedances 290, responsive to matching control signals 214. In particular, each of the adjustable impedances 290 can be implemented in accordance with any of the adjustable impedances discussed in association with the impedances used to implement programmable antenna element 200 discussed in FIGS. 7-11, with the control signals 252 being supplied by matching network control signal 214, instead of antenna control signals 212. In the configuration shown, a pi-network configuration is implemented with three adjustable impedances, however, one or more these adjustable impedances can alternatively be replaced by an open-circuit or short circuit to produce other configurations. Further, one or more of the adjustable impedances 290 can be replaced by fixed impedances, such as resistors, or fixed reactive network elements.

FIG. 14 is a schematic block diagram of an embodiment of an adjustable transformer in accordance with the present invention. An adjustable transformer is shown that can be used in either the implementation of programmable antenna element 200, with control signals 252 being supplied by antenna control signals 212. Alternatively, adjustable transformer 250 can be used to implement all or part of the programmable impedance matching network 204, with control signals 252 being supplied by matching network control signals 214. In particular, multi-tap inductors 254 and 256 are magnetically coupled. Switching network 235 controls the tap selection for terminals A and B (and optionally to ground) to produce a transformer, such as a balun transformer or other voltage/current/impedance transforming device with controlled impedance matching characteristics and optionally with controlled bridging.

Figure 15:
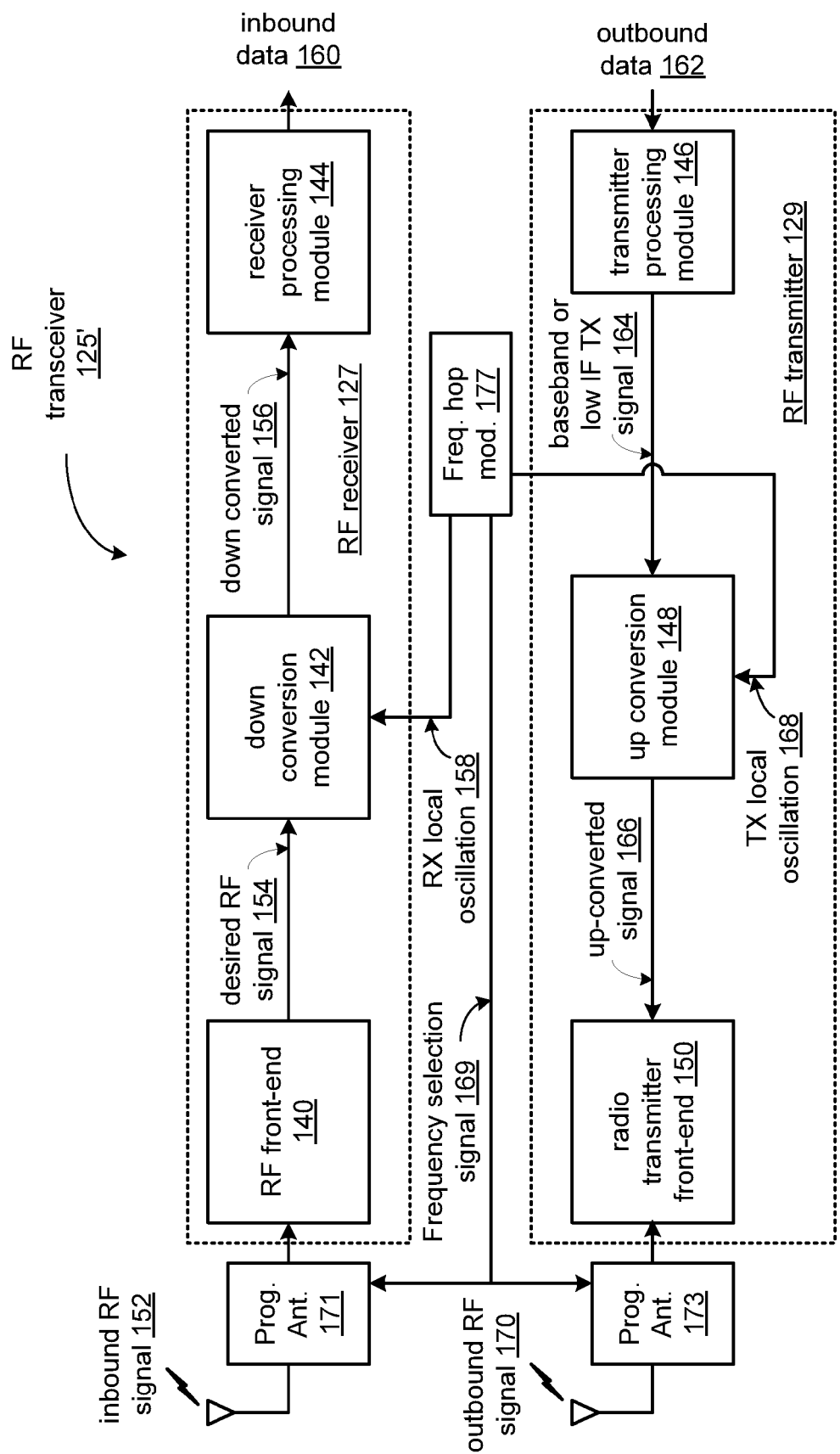
FIG. 15 is a schematic block diagram of an RF transceiver in accordance with the present invention.

FIG. 15 is a schematic block diagram of an RF transceiver in accordance with the present invention. An RF transceiver is presented that includes many common elements from RF transceiver 125 that are referred to by common reference numerals. In particular, an RF transmission and reception systems are disclosed that operate with frequency hopping. A frequency hop module generates frequency selection signal 169 that indicates a sequence of selected carrier frequencies. An RF transmitter 129 generates an outbound RF signal 170 at the sequence of selected carrier frequencies. Programmable antenna 173, such as programmable antenna 225 or 225' tunes to each frequency of the sequence of selected carrier frequencies, based on the frequency selection signal 169, to transmit the RF signal. Programmable antenna 171, such as programmable antenna 225 or 225', tunes to each frequency of the sequence of selected carrier frequencies, based on the frequency selection signal 169 and that receives an inbound RF signal 152 having the sequence of selected carrier frequencies. An RF receiver 127 demodulates the RF signal 127 to produce inbound data 160.

Figure 16:
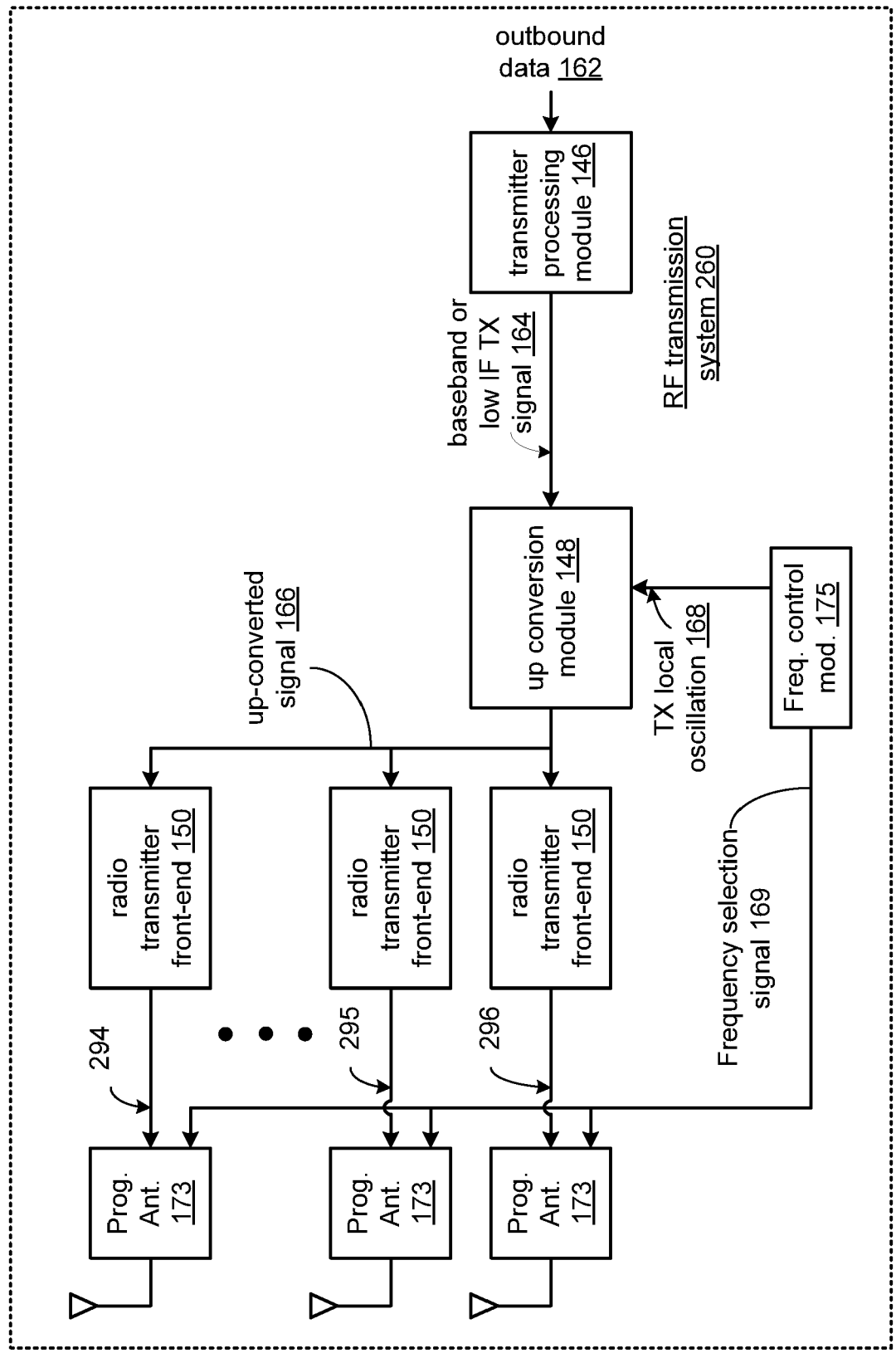
FIG. 16 is a schematic block diagram of an RF transmission system in accordance with the present invention.

FIG. 16 is a schematic block diagram of an RF transmission system in accordance with the present invention. An RF transmission system 260 is disclosed that includes many common elements from RF transmitter 129 that are referred to by common reference numerals. In particular, RF transmission system 260 includes either a plurality of RF transmitters or a plurality of RF transmitter front ends 150 that generate a plurality of RF signals 294-296 at a selected carrier frequency in response to a frequency selection signal 169. A plurality of programmable antennas 173 such as antennas 225 or 225', are each tuned to the selected carrier frequency, in response to the frequency selection signal, to transmit a corresponding one of the plurality of RF signals 294-296.

In an embodiment of the present invention, the plurality of RF transmitter front ends 150 are implemented as part of a multi-input multi-output (MIMO) transceiving system that broadcasts multiple signals that are recombined in the receiver. In one mode of operation, antennas 173 can be spaced with physical diversity. In an embodiment of the present invention, the plurality of RF transmitter front-ends are implemented as part of a polarization diversity transceiving system that broadcasts multiple signals at different polarizations by antennas 173 configured at a plurality of different polarizations.

Figure 17:
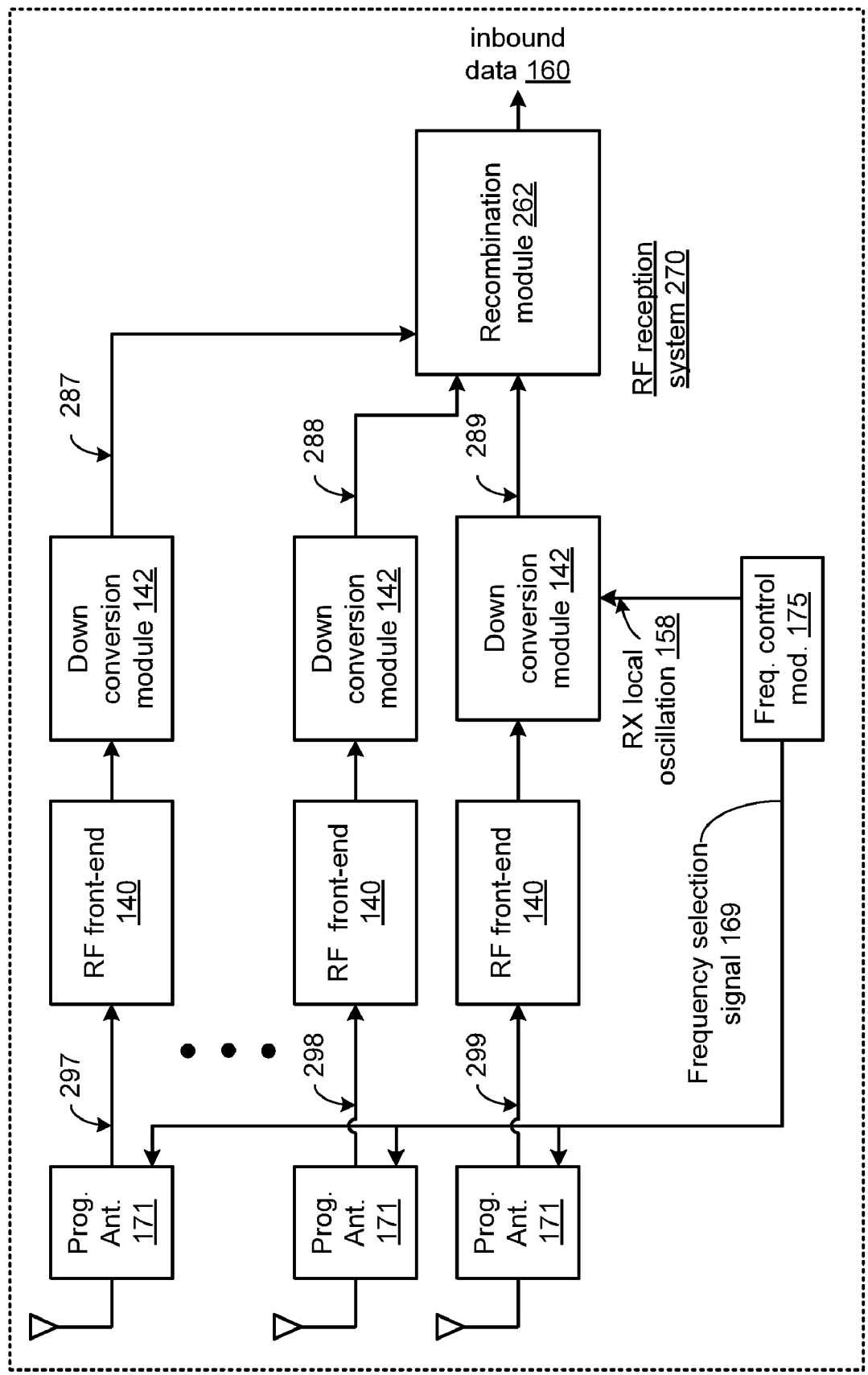
FIG. 17 is a schematic block diagram of an RF reception system in accordance with the present invention.

FIG. 17 is a schematic block diagram of an RF reception system in accordance with the present invention. An RF reception system 260 is disclosed that includes many common elements from RF receiver 127 that are referred to by common reference numerals. In particular, a plurality of programmable antennas 171 are each tuned to a selected carrier frequency in response to a frequency selection signal 169. The plurality of programmable antennas receive RF signals 297-299 having the selected carrier frequency. A plurality of RF receivers include RF front-ends 140 and down conversion modules 142, to demodulate the RF signal 297-299 into demodulated signal 287-289. A recombination module 262 produces a recombined data signal, such as inbound data 160 from the demodulated signals 287-289.

In an embodiment of the present invention, the plurality of RF front ends 140 are implemented as part of a multi-input multi-output (MIMO) transceiving system that broadcasts multiple signals that are recombined in the receiver. In one mode of operation, antennas 171 can be spaced with physical diversity. In an embodiment of the present invention, the plurality of RF front-ends 140 are implemented as part of a polarization diversity transceiving system that broadcasts multiple signals at different polarizations that are received by antennas 171, which are configured at a plurality of different polarizations.

Recombination module 262 can include a processing module that performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 18:
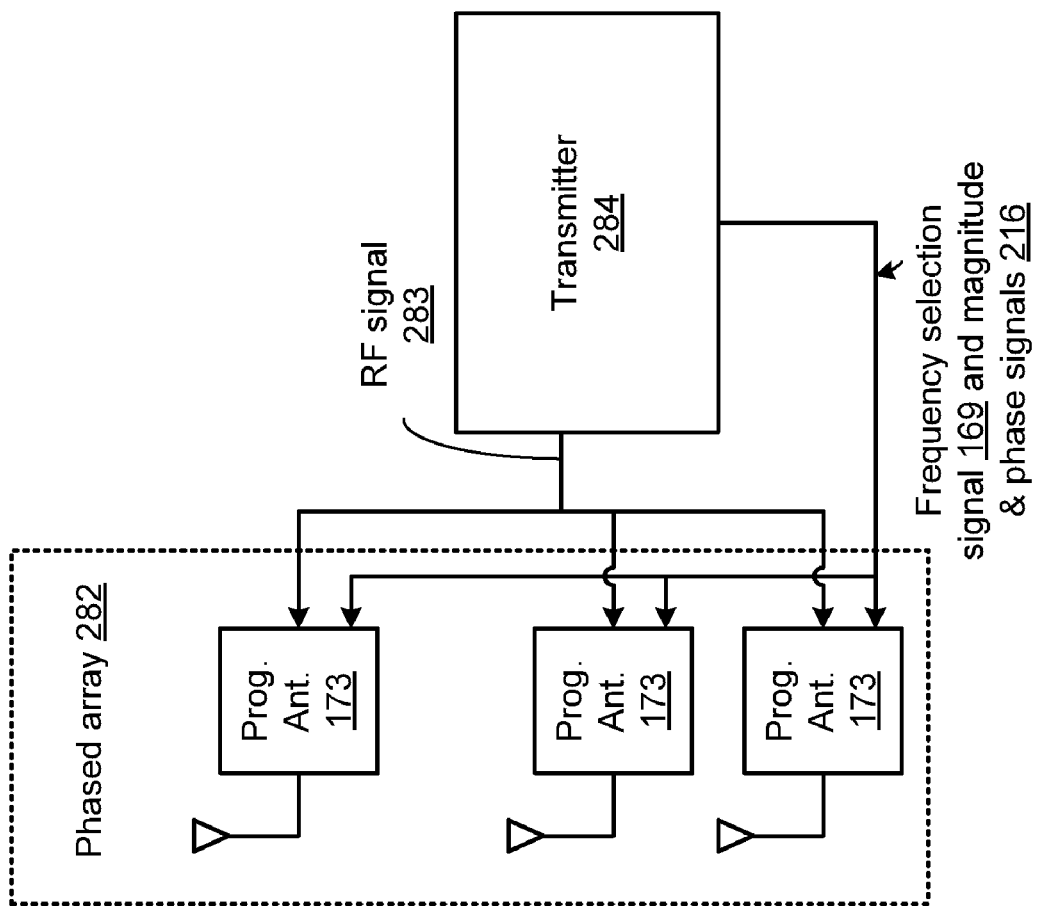
FIG. 18 is a schematic block diagram of a phased array antenna system 282 system in accordance with the present invention.

FIG. 18 is a schematic block diagram of a phased array antenna system 282 system in accordance with the present invention. In particular, phased array 282 includes a plurality of programmable antennas 173, such as programmable antennas 225 or 225', that are driven by an RF signal 283 from transmitter 284, such as RF transmitter 129. Transmitter 284 further includes frequency control module 175. Each of the plurality of programmable antennas 173 is tuned to a selected carrier frequency in response to a frequency selection signal 169. In addition, each of the plurality of programmable antennas has an antenna current that is adjusted in response to magnitude and phase adjust signals 216.

In an embodiment of the present invention, the plurality of programmable antennas combine to produce a controlled beam shape, such as with a main lobe in a selected direction, or a null in a selected direction. As the term null is used herein the radiation from the antenna in the selected direction is attenuated significantly, by an order or magnitude or more, in order to attenuate interference with another station set or to produce greater radiated output in the direction of the main lobe. The magnitudes and phases adjustments for each of the antennas can be calculated in many ways to achieve the desired beam shape, such as the manner presented in Stuckman & Hill, Method of Null Steering in Phased Array Antenna Systems, *Electronics Letters*, Vol. 26, No. 15, Jul. 19, 1990, pp. 1216-1218.

Figure 19:
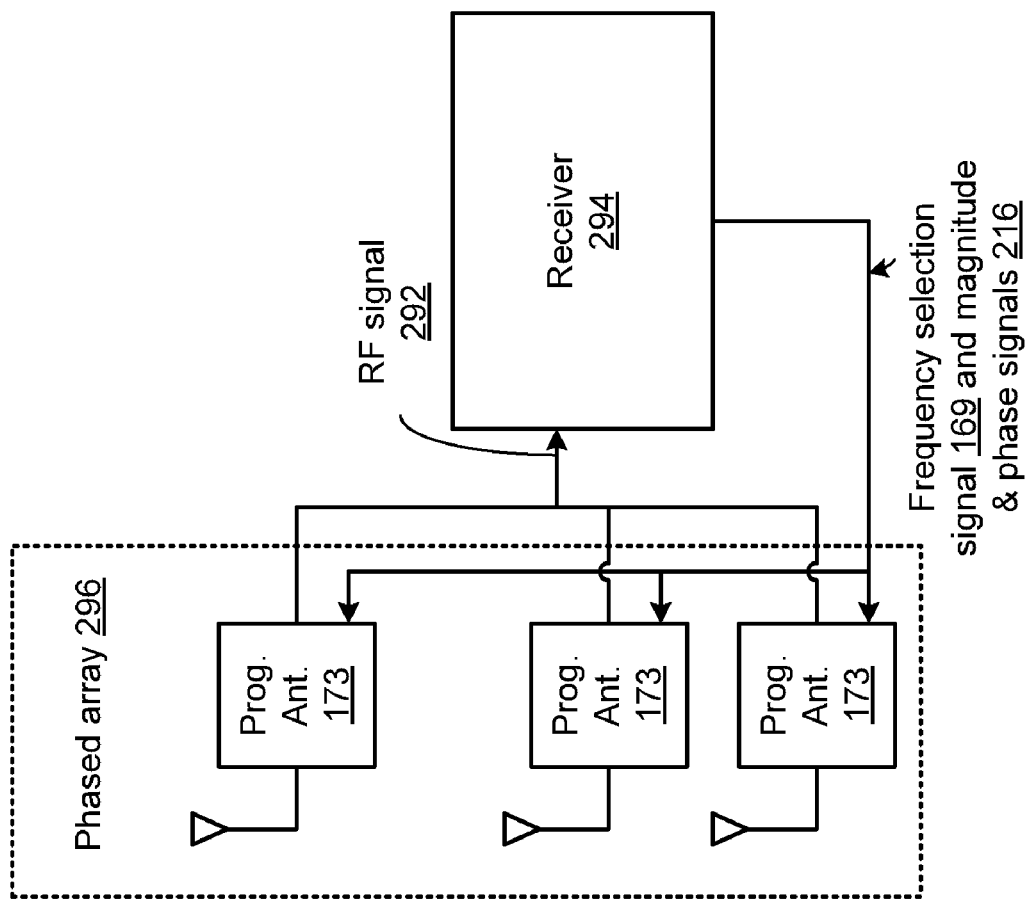
FIG. 19 is a schematic block diagram of a phased array antenna system 296 system in accordance with the present invention.

FIG. 19 is a schematic block diagram of a phased array antenna system 296 system in accordance with the present invention. In particular, phased array 296 includes a plurality of programmable antennas 173, such as programmable antennas 225 or 225', that combine to generate a plurality of RF signal 292 to receiver 294, such as RF receiver 127. Receiver 294 further includes frequency control module 175. Each of the plurality of programmable antennas 173 is tuned to a selected carrier frequency in response to a frequency selection signal 169. In addition, each of the plurality of programmable antennas has an antenna current that is adjusted in response to magnitude and phase adjust signals 216.

In an embodiment of the present invention, the plurality of programmable antennas combine to produce a controlled beam shape, such as with a main lobe in a selected direction, or a null in a selected direction. As discussed in conjunction with FIG. 18, the magnitudes and phases adjustments for each of the antennas can be calculated in many ways to achieve the desired beam shape.

Figure 20:
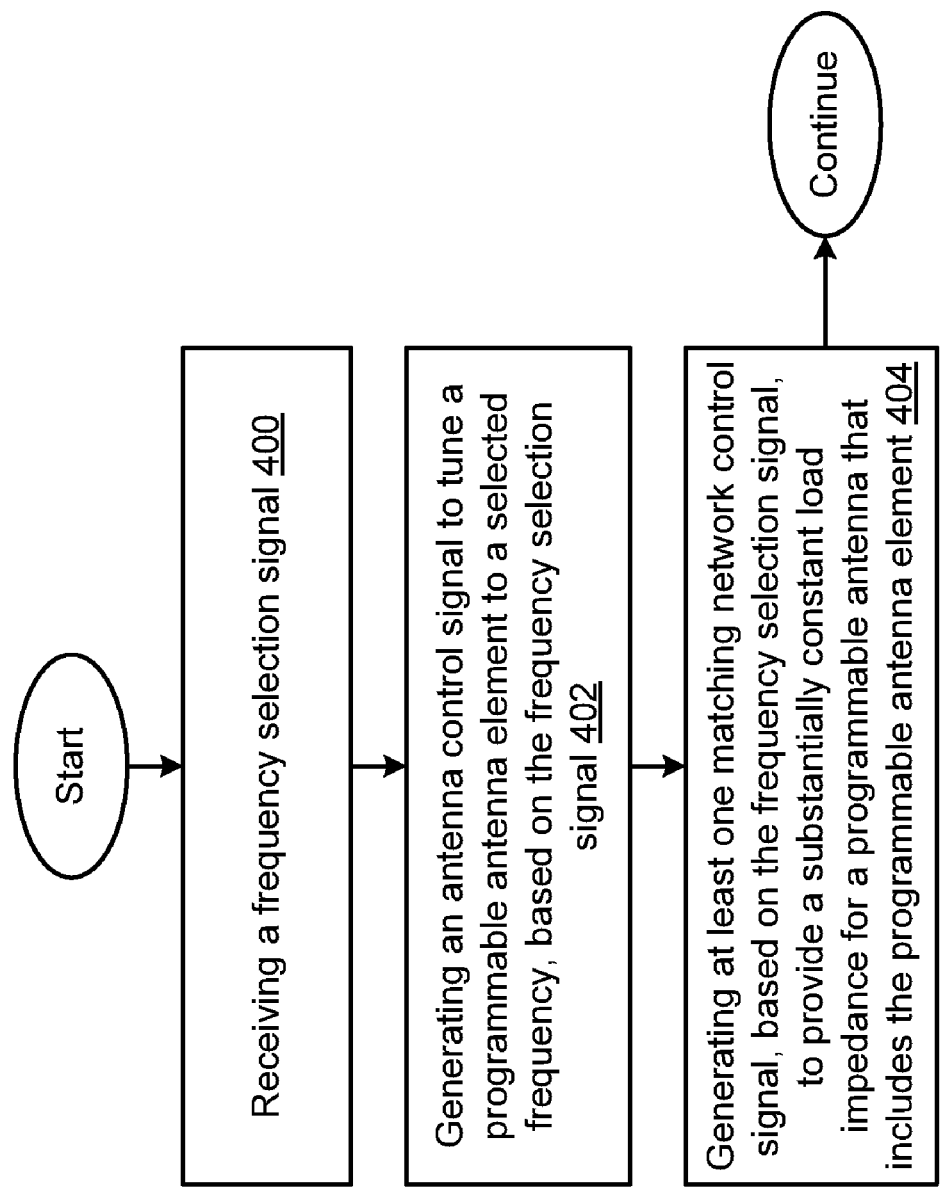
FIG. 20 is a flowchart representation of a method in accordance with an embodiment of the present invention.

FIG. 20 is a flowchart representation of a method in accordance with an embodiment of the present invention. In particular a method is presented for use with one or more features or functions presented in conjunction with FIGS. 1-19. In step 400, a frequency selection signal is receiver. In step 402, an antenna control signal is generated to tune a programmable antenna element to a selected frequency, based on the frequency selection signal. In step 404, at least one matching network control signal is generated, based on the frequency selection signal, to provide a substantially constant load impedance for a programmable antenna that includes the programmable antenna element.

In an embodiment of the present invention, the at least one matching network control signal is further generated in response to a selected magnitude of an antenna current of the programmable antenna and a selected phase of the antenna current. The at least one matching network control signal can be generated to tune an adjustable balun transformer, to tune at least one adjustable reactive network element, to control a switching network for selectively coupling a plurality of fixed reactive network elements, to select at least one of the plurality of fixed reactive network elements and deselect the remaining ones of the plurality of fixed reactive network elements and/or to tune a plurality of adjustable reactive network elements.

Figure 21:
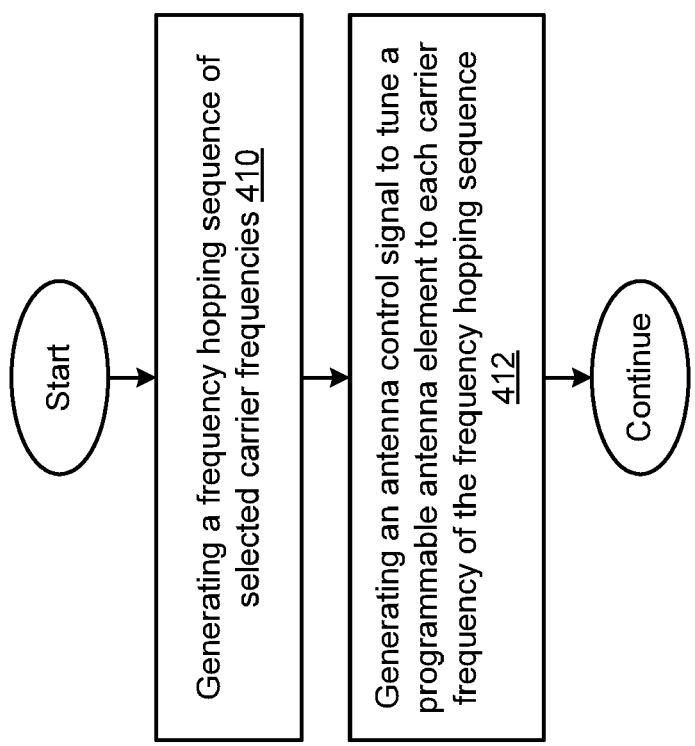
FIG. 21 is a flowchart representation of a method in accordance with an embodiment of the present invention.

FIG. 21 is a flowchart representation of a method in accordance with an embodiment of the present invention. In particular, a method is presented for use in conjunction with one or more features and function discussed in conjunction with FIGS. 1-20. In step 410, a frequency hopping sequence of selected carrier frequencies is generated. In step 412, an antenna control signal is generated to tune a programmable antenna element to each carrier frequency of the frequency hopping sequence.

Figure 22:
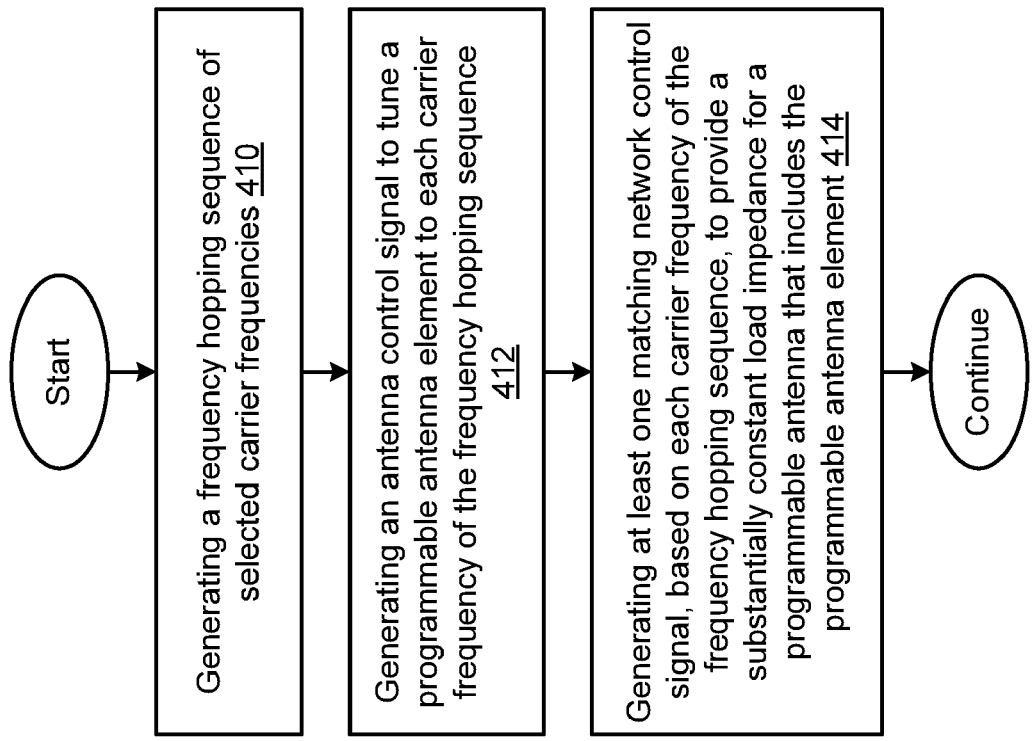
FIG. 22 is a flowchart representation of a method in accordance with an embodiment of the present invention.

FIG. 22 is a flowchart representation of a method in accordance with an embodiment of the present invention. In particular a method is presented for use in conjunction with one or more features discussed in conjunction with FIGS. 1-20, and that includes common elements from FIG. 21 that are referred to by common reference numerals. In addition, this method includes step 414 for generating at least one matching network control signal, based on each carrier frequency, to control a programmable impedance matching network to provide a substantially constant load impedance for a programmable antenna that includes the programmable antenna element.

In an embodiment of the present invention, at least one matching network control signal is further generated in response to a selected magnitude of an antenna current of the programmable antenna and a selected phase of the antenna current. the at least one matching network control signal is further generated in response to a selected magnitude of an antenna current of the programmable antenna and a selected phase of the antenna current. The at least one matching network control signal can be generated to tune an adjustable balun transformer, to tune at least one adjustable reactive network element, to control a switching network for selectively coupling a plurality of fixed reactive network elements, to select at least one of the plurality of fixed reactive network elements and deselect the remaining ones of the plurality of fixed reactive network elements and/or to tune a plurality of adjustable reactive network elements.

Figure 23:
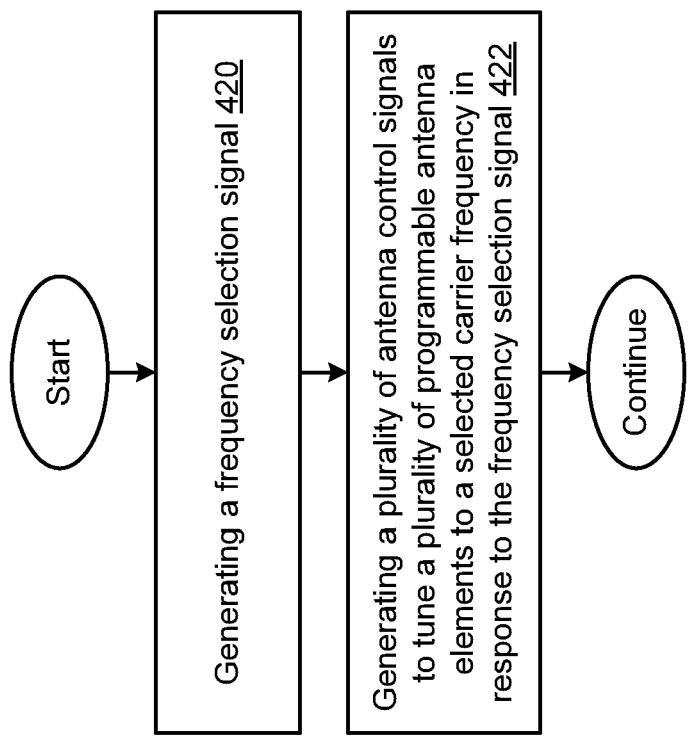
FIG. 23 is a flowchart representation of a method in accordance with an embodiment of the present invention.

FIG. 23 is a flowchart representation of a method in accordance with an embodiment of the present invention. In particular, a method is presented for use with one or more features or function discussed in conjunction with FIGS. 1-22. In step 420, a frequency selection signal is generated. In step 422, a plurality of antenna control signals are generated to tune a plurality of programmable antenna elements to a selected carrier frequency in response to the frequency selection signal.

Figure 24:
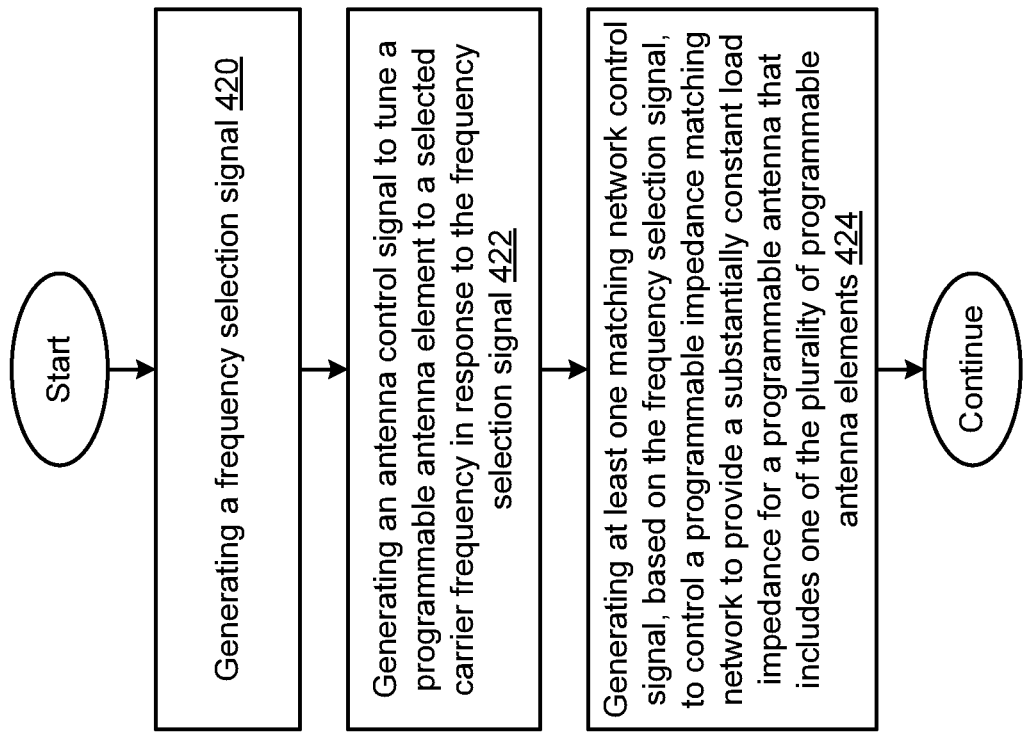
FIG. 24 is a flowchart representation of a method in accordance with an embodiment of the present invention.

FIG. 24 is a flowchart representation of a method in accordance with an embodiment of the present invention. In particular, a method is presented for use with one or more features or function discussed in conjunction with FIGS. 1-22, and that includes elements from FIG. 23 that are referred to by common reference numerals. In addition, the method includes step 424 for generating at least one matching network control signal, based on the frequency selection signal, to control a programmable impedance matching network to provide a substantially constant load impedance for a programmable antenna that includes one of the plurality of the programmable antenna elements.

In an embodiment of the present invention, the at least one matching network control signal is further generated in response to a selected magnitude of an antenna current of the programmable antenna and a selected phase of the antenna current.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A (radio frequency) RF reception system comprising:
a frequency hop module that generates a sequence of selected carrier frequencies;
a programmable antenna, coupled to the frequency hop module, that is tuned to each of the sequence of selected carrier frequencies and that receives an RF signal having the sequence of selected carrier frequencies via an antenna current, wherein the programmable antenna includes:
a fixed antenna element;
a programmable antenna element, coupled to the fixed antenna element, that is tunable to each of the sequence of selected carrier frequencies in response to at least one antenna control signal;
a control module, coupled to the programmable antenna element, that generates the at least one antenna control signal and generates a plurality of matching network control signals in response to the sequence of selected carrier frequencies; and
a programmable impedance matching network, coupled to the programmable antenna element and the control module, that includes a plurality of adjustable reactive network elements that are tunable in response in response to the corresponding plurality of matching network control signals, to provide a substantially constant load impedance;
an RF receiver, coupled to the frequency hop module and the programmable antenna, that demodulates the RF signal.

2. The RF reception system of claim 1 wherein the control module is further operable to generate the plurality of matching network control signals in response to a selected magnitude adjustment of the antenna current and a selected phase adjustment of the antenna current.

3. The RF reception system of claim 1 wherein the programmable impedance matching network includes an adjustable balun transformer.

4. The RF reception system of claim 1 wherein the programmable impedance matching network includes a plurality of reactive network elements that include the plurality of adjustable reactive network elements.

5. The RF reception system of claim 4 wherein the plurality of reactive network elements are arranged in a pi-network configuration.

6. The RF reception system of claim 4 wherein the plurality of reactive network elements are arranged in a t-network configuration.

7. The RF reception system of claim 4 wherein the plurality of adjustable reactive network elements each include a plurality of fixed reactive network elements and a switching network for selectively coupling the plurality of fixed reactive network elements in response to at least one of the plurality of matching network control signals.

8. The RF reception system of claim 7 wherein the switching network selects at least one of the plurality of fixed reactive network elements and that deselects the remaining ones of the plurality of fixed reactive network elements in response to at least one of the plurality of matching network control signals.

9. A (radio frequency) RF reception system comprising:
a frequency hop module that generates a sequence of selected carrier frequencies;
a programmable antenna, coupled to the frequency hop module, that is tuned to each of the sequence of selected carrier frequencies and that receives an RF signal having the sequence of selected carrier frequencies via an antenna current wherein the programmable antenna includes:
a control module, coupled to the programmable antenna element, that generates a plurality of matching network control signals in response to the sequence of selected carrier frequencies; and
a programmable impedance matching network, coupled to the programmable antenna element and the control module, that includes a plurality of adjustable reactive network elements that are tunable in response in response to the corresponding plurality of matching network control signals, to provide a substantially constant load impedance; and
an RF receiver, coupled to the frequency hop module and the programmable antenna, that demodulates the RF signal.

10. The RF reception system of claim 9 wherein the control module is further operable to generate the plurality of matching network control signals in response to a selected magnitude adjustment of the antenna current and a selected phase adjustment of the antenna current.

11. The RF reception system of claim 9 wherein the programmable impedance matching network includes an adjustable balun transformer.

12. The RF reception system of claim 9 wherein the programmable impedance matching network includes a plurality of reactive network elements that include the plurality of adjustable reactive network elements.

13. The RF reception system of claim 12 wherein the plurality of reactive network elements are arranged in a pi-network configuration.

14. The RF reception system of claim 12 wherein the plurality of reactive network elements are arranged in a t-network configuration.

15. The RF reception system of claim 12 wherein the plurality of adjustable reactive network elements each include a plurality of fixed reactive network elements and a switching network for selectively coupling the plurality of fixed reactive network elements in response to at least one of the plurality of matching network control signals.

16. The RF reception system of claim 15 wherein the switching network selects at least one of the plurality of fixed reactive network elements and that deselects the remaining ones of the plurality of fixed reactive network elements in response to at least one of the plurality of matching network control signals.

* * * * *